US012574311B2

(12) United States Patent
Wong et al.

(10) Patent No.: US 12,574,311 B2
(45) Date of Patent: Mar. 10, 2026

(54) SYSTEM AND METHOD FOR STREAMLINED DATA PACKET COMMUNICATION AND POLLING SYSTEM FOR WIRELESS INPUT/OUTPUT (IO) DEVICES

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 409 days.

(21) Appl. No.: 18/224,261

(22) Filed: Jul. 20, 2023

(65) Prior Publication Data

US 2025/0030622 A1    Jan. 23, 2025

(51) Int. Cl.
*H04L 43/103* (2022.01)
*H04L 5/00* (2006.01)
*H04W 76/18* (2018.01)

(52) U.S. Cl.
CPC .......... *H04L 43/103* (2013.01); *H04L 5/0055* (2013.01); *H04W 76/18* (2018.02)

(58) Field of Classification Search
CPC ..... H04L 43/103; H04L 5/0055; H04W 76/18
See application file for complete search history.

(56) References Cited

U.S. PATENT DOCUMENTS

| | | | |
|---|---|---|---|
| 7,801,099 B2 | 9/2010 | Desai | |
| 7,853,663 B2 | 12/2010 | Hoerl | |
| 8,364,080 B2 | 1/2013 | Desai | |
| 8,699,424 B2 | 4/2014 | Chandra | |
| 8,913,599 B2 | 12/2014 | Gonikberg | |
| 2010/0254332 A1* | 10/2010 | Cho ...................... | H04W 72/23 370/329 |
| 2013/0163460 A1* | 6/2013 | Gonikberg ............ | H04W 28/10 370/252 |

(Continued)

FOREIGN PATENT DOCUMENTS

EP            1841149 B1    11/2017

*Primary Examiner* — Xuan Lu
(74) *Attorney, Agent, or Firm* — Prol Intellectual Property Law, PLLC; H. Kenneth Prol

(57) ABSTRACT

A streamlined input/output (IO) device wireless communication packet polling and reception system of a wireless radio system, such as a wireless communication dongle, at an information handling system may comprise a controller to execute code instructions to transmit with the wireless radio system an initial polling packet initially allotting to a paired wireless IO device the data packet number and data packet transmission time slots for a first data packet communication frame, the controller to switch the wireless radio system to receive during the first data packet communication frame the initially allotted number of data packets at the initial allotted data packet transmission time slots from the wireless IO device, and the wireless radio system to transmit an updated polling packet acknowledging receipt of the transmitted number of data packets and instructing the wireless IO device for the allotted data packet number during a second data packet communication frame.

20 Claims, 8 Drawing Sheets

(56)                    References Cited

U.S. PATENT DOCUMENTS

| | | | |
|---|---|---|---|
| 2020/0137470 A1* | 4/2020 | Chazot ................. | H04L 1/0072 |
| 2022/0096003 A1* | 3/2022 | Mai .................... | H04L 25/0224 |
| 2022/0137177 A1* | 5/2022 | Hammerschmidt .... | G01S 7/006 |
| | | | 455/456.1 |
| 2024/0333459 A1* | 10/2024 | Chazot ................. | H04L 5/0044 |
| 2025/0028657 A1* | 1/2025 | Wong ................... | G06F 13/122 |
| 2025/0039931 A1* | 1/2025 | Wong ................... | H04W 28/26 |

* cited by examiner

SYSTEM AND METHOD FOR STREAMLINED DATA PACKET COMMUNICATION AND POLLING SYSTEM FOR WIRELESS INPUT/OUTPUT (IO) DEVICES

FIELD OF THE DISCLOSURE

The present disclosure generally relates to wireless peripheral input/output (IO) devices, such as mice, keyboards, earbuds, headphones, headsets, and virtually reality peripherals. More specifically, the present disclosure relates to a wireless communication from an information handling system, operating independently from the information handling system operating system (OS) for orchestrating streamlined transmission by one or more wireless peripheral IO devices of data packets to the information handling system that increases data transmission rate and decreases power consumption.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
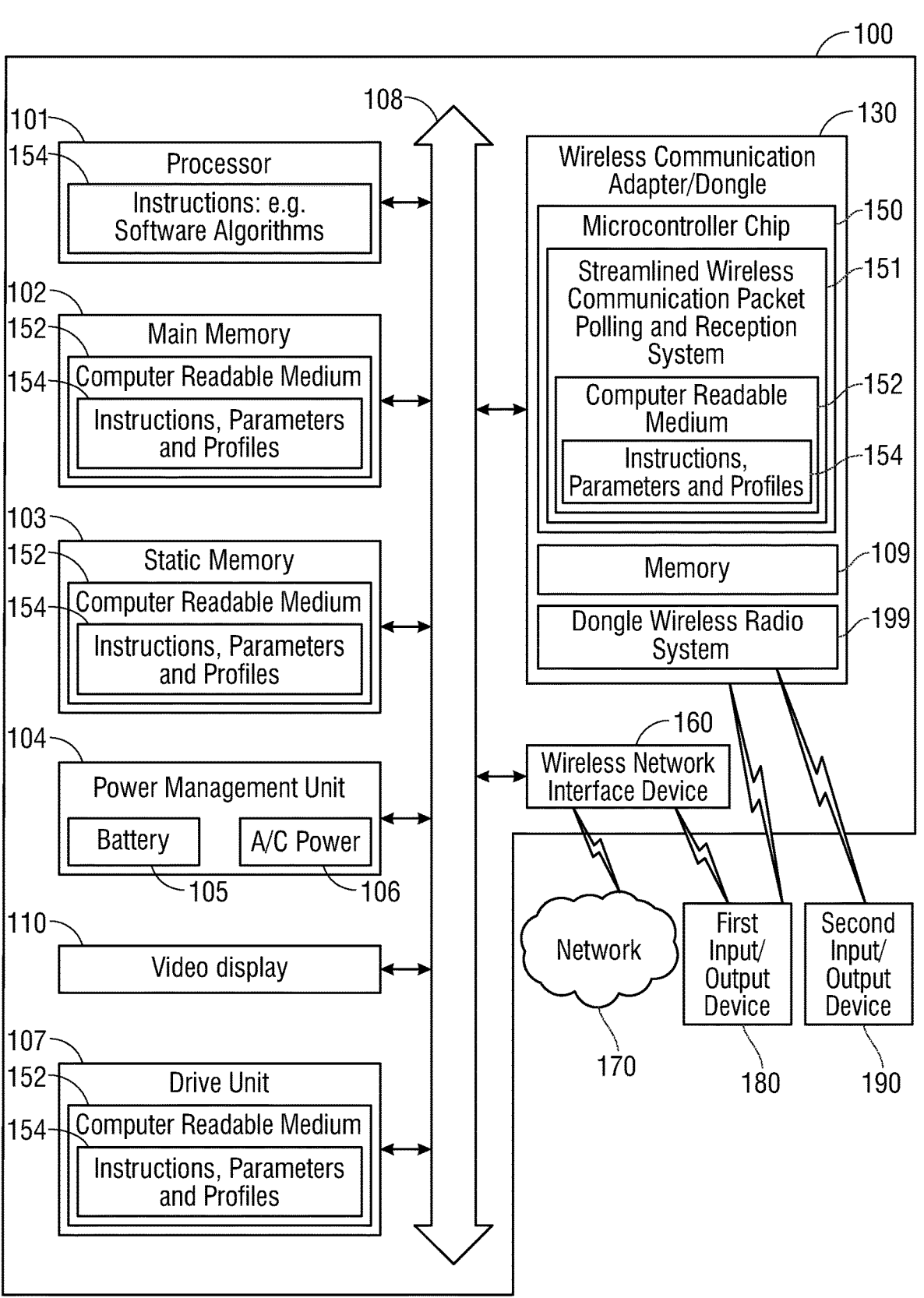
FIG. 1 is a block diagram illustrating an information handling system with a wireless radio system or operatively coupled to a wireless communication dongle orchestrating wireless communication with plural wireless input/output (IO) devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices, also referred to as wireless IO devices herein, (e.g., mouse, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with some or all the Bluetooth® Low Energy (BLE) radio protocols.

For example, many existing wireless IO devices are designed to communicate with a wireless communications dongle using a one reception/one transmission (1RX/1TX) format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, requires more airtime for acknowledgments, and causes a high potential for collision between incoming wireless IO device data packets and outgoing ACK data packets. In the case of such a collision, the wireless communications dongle may fail to transmit an ACK data packet (as no data packet has been received by the dongle from the wireless IO device due to the collision), and the wireless IO device may then either resend the missed data packet or skip this resend and simply transmit the next available data packet. Such a 1RX/1TX system may be limited in data throughput and consume power unnecessarily for such transmit and receive switches during operations. Such systems may cause the customer to experience slow response from a wireless IO device, a lag between their input via the wireless IO device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1RX/1TX approach may fail to meet customer needs during execution of latency-sensitive software applications such as gaming applications or other high definition audio/visual applications.

Because transmission and reception of data packets using this 1RX/1TX approach does not require any synchronized or scheduled delivery of data packets from any given wireless IO device, communication with a plurality of wireless IO devices further increases the risk of latency and collisions. For example, the wireless communication dongle in such a scenario may need to transmit ACK data packets to both paired wireless IO devices, presenting more potential delay and use of airtime for acknowledgements while switching between plural paired wireless IO devices or a greater opportunity for the wireless communications dongle to be in transmit mode when a data packet is incoming. In other words, communication with a plurality of wireless IO devices may cause an even more limited data throughput level or greater number of missed or dropped data packets, causing even greater customer-perceived latency or poor user experience. A system is needed to decrease power consumed, decrease collision rate, and decrease latency of communication of data packets between one or more wireless IO devices and wireless radio adapters such as wireless communications dongles to provide higher available wireless throughput levels while operating according to an efficient wireless IO device communication protocol according to embodiments herein.

The streamlined wireless communication packet polling and reception system in embodiments of the present disclosure addresses these issues by orchestrating scheduled delivery of a plurality of data packets from each of one or more wireless IO devices in a data packet communication frame between delivery of ACK data packets to each of those one or more wireless IO devices. In embodiments of the present disclosure, a wireless radio adapter, such as in a wireless communications dongle, may receive a request to connect from one or more wireless IO devices (e.g., mouse and headset), and may respond by transmitting a polling packet that instructs each of the wireless IO devices paired with the wireless communications dongle to transmit a plurality of data packets of a specified length and at specified time slots during a first data packet communication frame between the wireless communications dongle and each of the paired wireless IO devices. A microcontroller executing code instructions of the streamlined wireless communication packet polling and reception system at the wireless communications dongle may ensure that, during this first data packet communication frame in which time slots have been allocated to the one or more wireless IO devices (e.g., mouse and headset), the wireless radio system, such as in the wireless communication dongle, remains in a receive mode to receive data packets from the one or more paired wireless IO devices in accordance with the number of packets prescribed and the duration (e.g., based on packet lengths) from each of the one or more wireless IO devices. In other words, the controller of the wireless communications dongle or other wireless radio adapter may avoid any power loss from additional airtime or inadvertent collision threat due to rapid switching between RX/TX modes during this first data packet communication frame. Following the first data packet communication frame at the end of a time period determined by the number of packets expected, packet lengths, and any spacing time, the controller of the wireless communications dongle or other wireless radio adapter executing code instructions of the streamlined wireless communication packet polling and reception system may switch to transmit mode and transmit to each of the paired wireless IO devices an acknowledgement packet identifying the number of packets received during the first data packet communication frame from each of the paired wireless IO devices. In addition, this acknowledgement packet may further include instructions for the one or more paired wireless IO devices to transmit a specified plurality of data packets of a specified length and at specified time slots during a second data packet communication frame between the wireless communications dongle and each of the paired wireless IO devices. This specified number of packets, packet lengths, and specified time slots may remain the same as in the first data packet communication frame or may be adjusted according to various embodiments herein for the second data packet communication. In such a way, the streamlined wireless communication packet polling and reception system may decrease the frequency of ACK data packets transmitted, and the frequency of mode-switching described above with respect to existing systems. This may further decrease power consumed by rapid mode-switching and decrease latency and improve overall user experience.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of a streamlined wireless communication packet polling and reception system 151 in an embodiment to orchestrate scheduled delivery of a plurality of data packets from each of a plurality of paired wireless input/output (IO) devices (e.g., 180 and 190) during scheduled data packet communication frames. It is appreciated that information handling system 100 may use a wireless communications dongle or integrated wireless radio adapter 130 to wirelessly communicate with one or more wireless IO devices 180 or 910. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100, may operate using Bluetooth® Low Energy (BLE) radio layer protocol (e.g., a BLE radio with Gaussian Frequency Shift Keying (GFSK) data modulation) as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices 103 or 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications dongle 130, which may orchestrate scheduled delivery of a plurality of data packets from each of a plurality of wireless input/output (IO) devices (e.g., 180 and 190) during scheduled data packet communication frames according to various embodiments of the present disclosure. The wireless communication dongle 130 or integrated wireless radio adapter in an embodiment may house a microcontroller 150 executing firmware instructions of the streamlined wireless communication packet polling and reception system 151 in an embodiment. The wireless communication dongle 130 may be operatively coupled to the information handling system 100 through insertion of the wireless communication dongle 130 within a USB port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio data modulation (e.g., a BLE radio with Gaussian Frequency Shift Keying (GFSK)) with the wireless communication adapter/dongle 130 under the modified wireless IO device communication protocol of embodiments herein. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio data modulation (e.g., a BLE radio with Gaussian Frequency Shift Keying (GFSK)) as modified with the wireless IO device communication protocol of embodiments herein. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, earbuds, headphones, smart speakers, or virtual reality peripherals, as described in greater detail herein. Such wireless links may be established pursuant to BLE Radio Layer protocol with GFSK data modulation, for example. In some embodiments, the BLE radio layer protocol and GFSK may be used to establish a Private Area Network (PAN) (e.g., 170) in which the information handling system 100 may communicate wirelessly with any wireless IO devices (e.g., 180 and 190) paired to the PAN 170 using a BLE Radio Layer protocol compliant pairing and wireless communication profile as modified with the wireless IO device communication protocol of embodiments herein. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHZ. Reference to Bluetooth® may refer to either or both of the Bluetooth® or Bluetooth Low Energy (BLE) and any revision of those radio layer protocol or other relevant portions of the protocols that may be used as modified with the wireless IO device communication protocol of embodiments herein.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® data communication standards. To communicate with a wireless personal area network (WPAN), standards including IEEE 802.15 WPAN standards, Service Discovery Protocol (SDP), Radio Frequency Communications (RF-COMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of a streamlined wireless communication packet polling and reception system 151, or other aspects or components. Application instructions 154 may also include any application processing drivers, or the like executing on information handling system 100 or wireless communication dongle 130.

The streamlined wireless communication packet polling and reception system 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the streamlined wireless communication packet polling and reception system 151, firmware algorithms, processes, and/or methods may be stored here. More specifically, instructions 154 may be executed by microcontroller integrated circuit 150 or other processing resources such as an embedded controller (EC) or the processor 101 to orchestrate transmission of data packets from one or more wireless IO devices 180 and 190 with the wireless communication dongle 130 during a data packet communication frames according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the streamlined wireless communication packet polling and reception system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and a plurality of wireless IO devices (e.g., 180 and 190), the microcontroller 150 may execute code instructions 154 of the streamlined wireless communication packet polling and reception system 151 to orchestrate transmission of a plurality of data packets from one or more of the wireless IO devices (e.g., 180 or 190) during one or more data packet communication frames, as described in embodiments herein.

The information handling system 100 may include a memory 102, (with computer readable medium 152 that is volatile (e.g. random-access memory, etc.), nonvolatile (read-only memory, flash memory etc.) or any combination thereof), one or more processing resources, such as a central processing unit (CPU), a graphics processing unit (GPU), a Visual Processing Unit (VPU) or a Hardware Accelerator, any one of which or combination may be the processor 101 illustrated in FIG. 1. Additional components of the information handling system 100 may include one or more storage devices 103 or 107, a wireless network interface device 160, one or more communications ports for communicating with external devices, as well as various input and output (IO) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, various components of the wireless communication dongle 130 (e.g., microcontroller chip 150, memory 109, or wireless communication dongle wireless radio system 199), a static memory 103 or drive unit 107 or other components of an information handling system. The information handling system 100 may include a processor 101 such as a central processing unit (CPU), a GPU, a Visual Processing Unit (VPU), or a hardware accelerator, embedded controllers or some combination of the same. Any of the processing resources may operate to execute code that is either firmware or software code.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
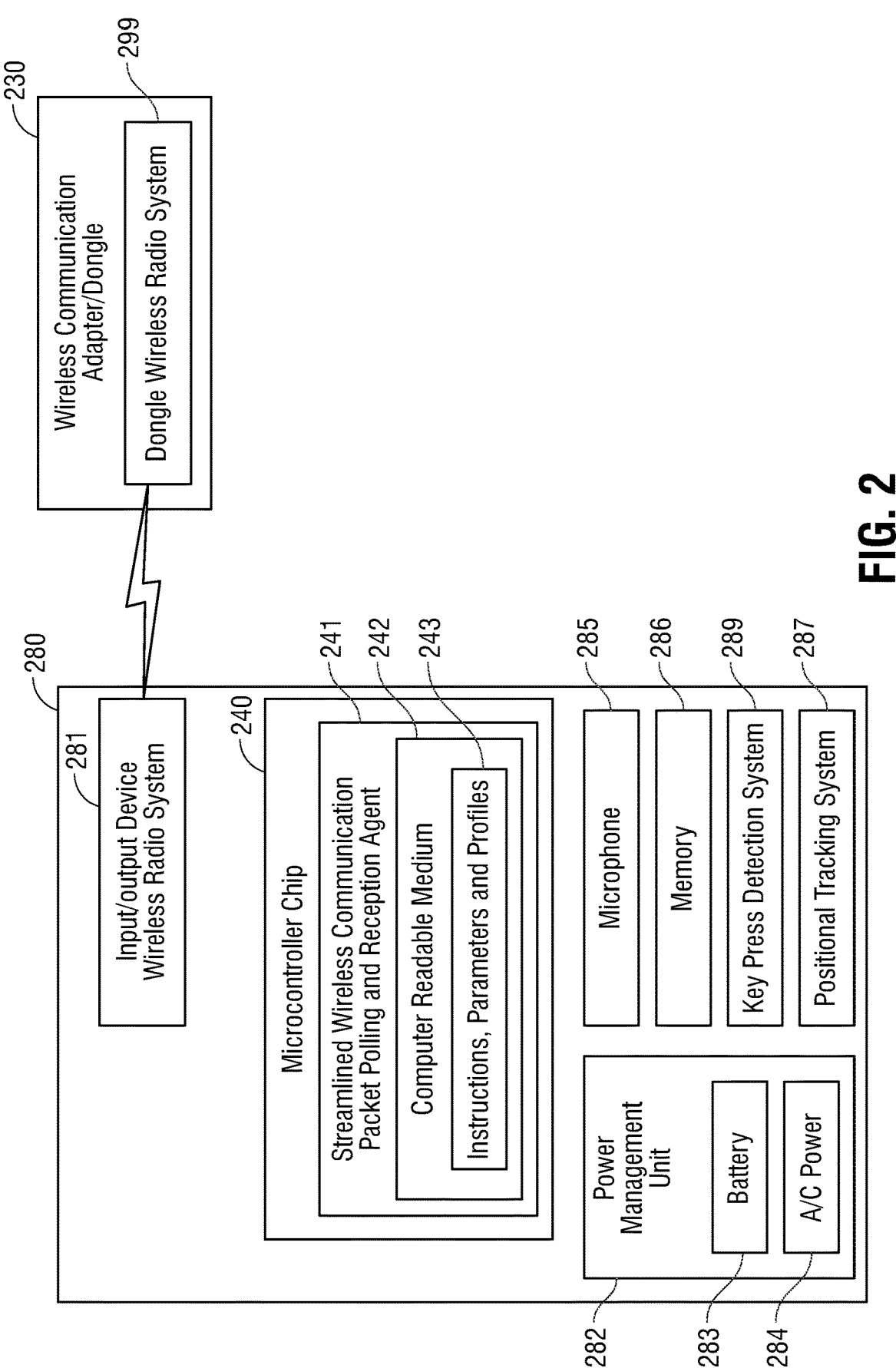
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of a streamlined wireless communication packet polling and reception agent 240 at the wireless IO device 280 to transmit data packets from the wireless IO device 280 to the wireless communication dongle 230 during a data packet communication frame according to orchestrating instructions received from the wireless communication dongle 230. As described herein, the wireless communication dongle 230 in an embodiment may include a controller executing code instructions of a streamlined IO device wireless communication packet polling and reception system to orchestrate transmission of plural data packets from one or more paired wireless IO devices (e.g., 280) during any data packet communication frame. Such an orchestration may be initiated by transmission from the dongle wireless radio system 299 to the IO device wireless radio system 281 of one or more polling packets to each elicit plural data packets, as described herein. The streamlined wireless communication packet polling and reception agent 241 of the wireless IO device 280 may operate to instruct the IO device wireless radio system 281 to transmit data packets within a synchronized data packet communication frame between the wireless communication dongle 230 and the wireless IO device 280 according to the received polling packets having coordinating instructions as to number of packets, packet lengths, and time slots to be used.

The IO wireless radio system 281 in an embodiment may be capable of communication between the wireless IO device 280 and the wireless communication dongle 230 using a wireless link established under protocols such as Bluetooth® or Bluetooth Low Energy protocols, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to Bluetooth® or Bluetooth Low Energy® (BLE) radio protocols, for example. The IO device wireless radio system 281 may operate in accordance with any Bluetooth® data communication standards. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse, the wireless IO device 280 may further include a position tracking system 287 capable of recording or tracking changes in position of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein.

In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein.

Instructions 243 of the streamlined wireless communication packet polling and reception agent 241 may be executed by the microcontroller chip 250, for example a controller integrated circuit, to transmit such data packets to the wireless communication dongle 230 at an information handling system pursuant to polling packets generated at the streamlined wireless communication packet polling and reception system operating at the wireless communication dongle 230 and transmitted to the wireless IO device 280. Such instructions 243 of the streamlined wireless communication packet polling and reception agent 241 may include instructions for instructing transmission of data packets by the IO device wireless radio system 281 of an allotted data packet number, having an allotted data packet length, at allotted data packet transmission time slots, as identified within polling packets received at the wireless IO device 280 from the wireless communication dongle 230. Instructions 243 for the streamlined wireless communication packet polling and reception agent 241 may also include instructions for generating an adjustment request header to be appended to a first data packet transmitted according to a received polling packet during a given data packet communication frame, as described herein. Such an adjustment request header in an embodiment may request an adjustment to the allotted data packet number, having an allotted data packet length, at allotted data packet transmission time slots, as identified within polling packets received at the wireless IO device 280 from the wireless communication dongle 230. The instructions 243 of the streamlined wireless communication packet polling and reception agent 241 may also include instructions for ad-hoc adjustment of the number/length of data packets transmitted during a current data packet communication frame that is greater or less than the allotted number/length of data packets identified within a received polling packet for that data packet communication frame, under certain conditions explained in greater detail below. Identifying information for the wireless IO device 280 may be stored in memory 286 in an embodiment. Such identifying information in an embodiment may operate to identify the wireless IO device 280 as a device authorized to transceive data with the dongle 230, as well as information sufficient to identify the wireless IO device 280, such as a Media Access Control (MAC) address, IP address, or model number.

The wireless IO device 280 may, in some embodiments includes a processing resource such as a microcontroller 240. Any of the processing resources described herein may be used and may operate to execute code that is either firmware or software code. Instructions 243 may include a streamlined wireless communication packet polling and reception agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of a streamlined wireless communication packet polling and reception agent 241, or other aspects or components. The streamlined wireless communication packet polling and reception agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the streamlined wireless communication packet polling and reception agent 241 may operate in part as software or firmware instructions executed on the wireless IO device 280. The instructions 243 may embody one or more of the methods as described herein. For example, instructions relating to the streamlined wireless communication packet polling and reception agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the streamlined wireless communication packet polling and reception agent 241 may be stored in memory 286 on a computer-readable medium 242 such as a flash memory or magnetic disk in an example embodiment.

Figure 3:
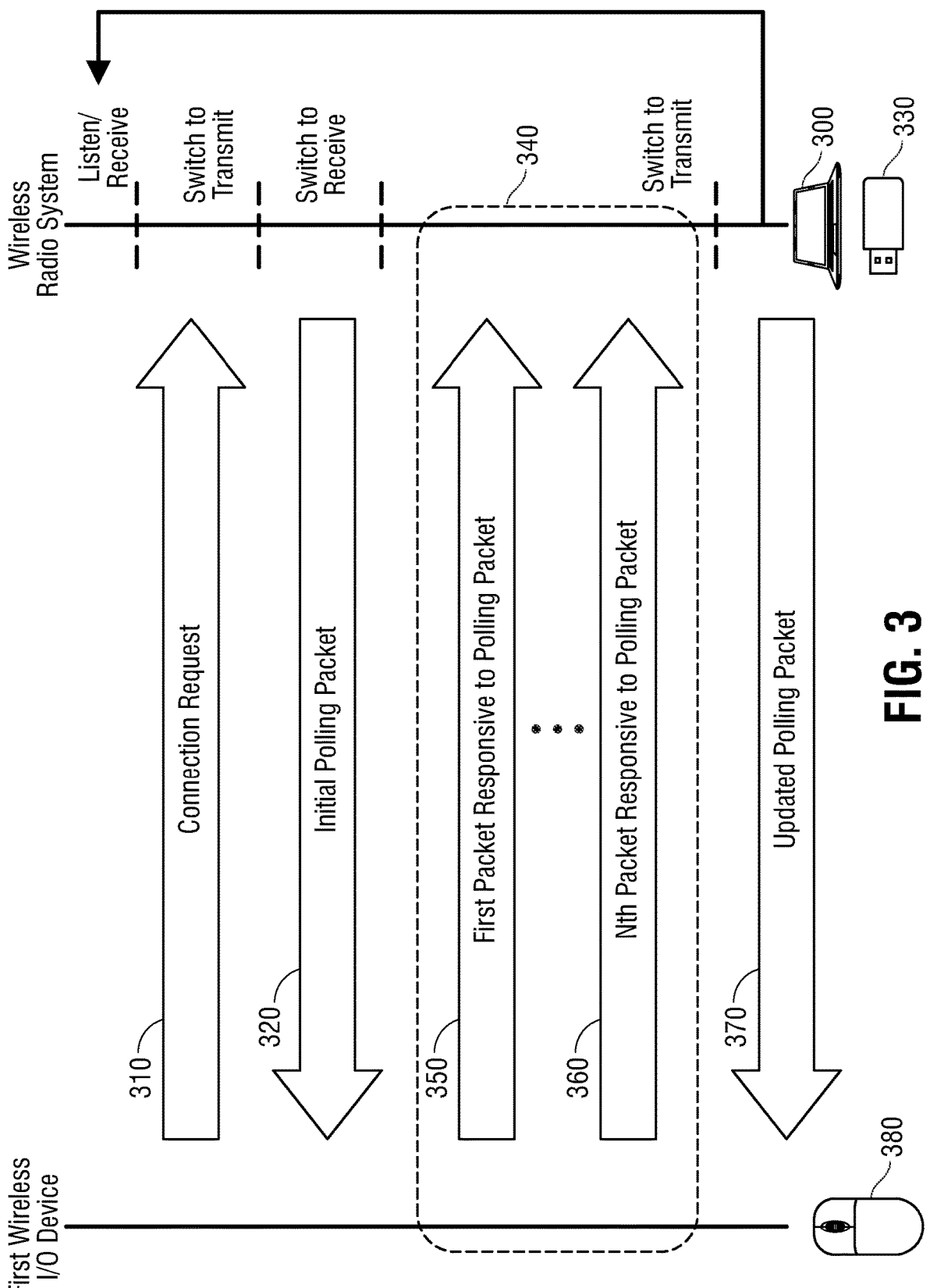
FIG. 3 is a block diagram illustrating a data packet communication frame orchestrated by the streamlined IO device wireless communication packet polling and reception system according to an embodiment of the present disclosure.

FIG. 3 is a block diagram illustrating a data packet communication frame between a wireless communications dongle or integrated wireless radio system and a paired wireless input/output (IO) device orchestrated by a controller of the wireless communications dongle or integrated wireless radio system executing code instructions of the streamlined IO device wireless communication packet polling and reception system according to an embodiment of the present disclosure. As described herein, the streamlined wireless communication packet polling and reception system executing at an information handling system 300 or via a controller within a wireless communications dongle 330 operably connected to the information handling system 300 in an embodiment may schedule receipt of a plurality of data packets from one or more paired wireless IO devices (e.g., mouse 380) between delivery of polling packets and data packets that include an acknowledgement header (ACK) to each of those one or more paired wireless IO devices (e.g., mouse 380). For ease of explanation, the streamlined IO device wireless communication packet polling and reception system in various embodiments herein may be described as executing at the wireless communications dongle 330 in some embodiments herein. However, it is also contemplated that the streamlined IO device wireless communication packet polling and reception system may operate internally within an integrated wireless radio system of the information handling system 300 in an embodiment. In either embodiment, the wireless communication dongle 330 or integrated wireless radio system is capable of establishing wireless links with the wireless IO device 380 according to the Bluetooth® or Bluetooth® Low Energy (BLE) radio protocols.

In an embodiment, the wireless communications dongle 330 (or information handling system 300) may be placed within a receive (RX) mode. Within this RX mode, a wireless radio system of the wireless communications dongle 330 or the information handling system 300 may scan a plurality of frequencies at which wireless IO devices (e.g., 380) may be expected to transmit requests to communicate with the wireless communication dongle 330 or the information handling system 300. While in this RX mode, the wireless radio system of the wireless communications dongle 330 or the information handling system 300 may receive the request to connect 310 with the wireless communications dongle 330 or the information handling system 300. This connection request 310 in some embodiments may include an identification of the model number or various default communication metrics for the mouse 380 or other identifying information for the mouse 380 or other IO devices that the wireless communications dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380 or other IO devices. As another example, the connection request 310 may include identification for the mouse 380 or other IO devices that is associated with a profile stored at the wireless communications dongle 330 or the information handling system 300 providing such standard data packet transmission rate or standard data packet transmission length.

Upon success of the connection requested, the wireless communications dongle 330 or the information handling system 300 may switch to a transmit (TX) mode. The controller of the wireless communications dongle 330 or the information handling system 300 integrated wireless radio system executing code instructions of the streamlined IO device wireless communication packet polling and reception system in an embodiment may generate an initial polling packet 320 that instructs each of the wireless IO devices (e.g., 380) paired with the wireless communications dongle 330 or the information handling system 300 to transmit a plurality of data packets of a specified length and at specified time slots during a first data packet communication frame between the wireless communications dongle 330 or the information handling system 300 and each of the paired wireless IO devices (e.g., 380). The controller of the wireless communications dongle 330 or the information handling system 300 executing code instructions of the streamlined IO device wireless communication packet polling and reception system in an embodiment may determine an initial allotted data packet number, initial allotted data packet length, or initial allotted data packet transmission time slots for receipt of data packets transmitted from the wireless IO device 380 based on default initial values that apply to the paired wireless IO device or to a wireless IO device 380 identifiable based on information given within the request to connect. For example, the controller of the wireless communications dongle 330 or the information handling system 300 executing code instructions of the streamlined IO device wireless communication packet polling and reception system may determine an initial allotted data packet number of five, initial allotted data packet length of 23 bytes (B), or initial allotted data packet transmission time slots every 0.000167 seconds (e.g., 167 us) for receipt of data packets transmitted from the wireless IO device 380 within a data packet communication frame having a total length of 0.000833 seconds plus any delay or gap times included, or about 1 us. The controller of the wireless communications dongle 330 or the information handling system 300 may instruct the wireless radio system to transmit an initial polling packet 320 containing the initial allotted data packet number, the initial allotted data packet length, and initial allotted data packet transmission time slots. This initial polling packet 320 in an embodiment may synchronize communication between the wireless communications dongle 330 or the information handling system 300 and the wireless IO device 380 for a data packet communication frame beginning at a specified time and having the specified duration (e.g., 0.0138 seconds). Upon transmission of the initial polling packet 320 in an embodiment, the controller for the wireless communications dongle 330 or the information handling system 300 may switch the wireless radio system into a receive mode to await the beginning of the data packet communication frame from the wireless IO device 380.

At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a length equivalent to the initial allotted data packet length of 23 Bytes and may be delivered at the synchronized time designating the beginning of the data packet communication frame 340 within the first of five initial allotted data packet transmission time slots, as defined within the initial polling packet 320. In other embodiments, as described in greater detail with respect to FIGS. 4A, 4B, and 4C, this first packet 350 may further include a request to adjust the initial allotted data packet number, initial allotted data packet length, or initial allotted data packet time slots.

A microcontroller executing code instructions of the streamlined wireless communication packet polling and reception system at the wireless communications dongle 330 or the information handling system 300 may ensure that, during this data packet communication frame 340, the wireless radio system remains in a receive mode to receive data packets from the one or more paired wireless IO devices (e.g., 380) during the anticipated duration of the data packet communication frame 340. In other words, the controller of the wireless communications dongle 330 or the information handling system 300 may avoid any power loss, data rate transmission delay, or inadvertent data packet collision threat due to rapid switching between RX/TX modes during this data packet communication frame 340. During the data packet communication frame 340 in an embodiment, the wireless radio system of the wireless communication dongle 330 or the information handling system 300 may receive a plurality of data packets equivalent to the initial allotted data packet number as defined within the initial polling packet 320. For example, in an embodiment in which the initial polling packet 320 identified an initial allotted data packet number of five, the Nth packet 360 received by the wireless radio system of the wireless communication dongle 330 or the information handling system 300 may be the fifth of five data packets transmitted during the data packet communication frame 340 from the wireless IO device 380 to the wireless communication dongle 330 or the information handling system 300. Each of the five data packets transmitted to the wireless communication dongle 330 or the information handling system 300 in an embodiment may have the initial allotted data packet number and initial allotted data packet length and may be transmitted at the designated initial allotted data packet transmission time slots identified within the initial polling packet 320. In other embodiments described in greater detail below with respect to FIGS. 4A, 4B, and 4C, the number or length of data packets transmitted, or the time slots at which those data packets are transmitted may differ from the initial allotted data packet number, initial allotted data packet length, or initial allotted data packet transmission time slots depending on a plural number of wireless IO devices paired or based on adjustments to these values as requested by the wireless IO device in the first data packet and capacity of the wireless radio system to accommodate such a request.

Following the data packet communication frame 340, the controller of the wireless communications dongle 330 or the information handling system 300 may switch the wireless radio system to a transmit mode for further synchronizing future data packet communication frames and also acknowledging receipt or missed packets from a previous data packet communication frame. The controller may execute code instructions of the streamlined wireless communication packet polling and reception system in an embodiment to generate and transmit an updated polling packet 370. In an embodiment, such an updated polling packet 370 may include an acknowledgement header (ACK) identifying the number (N) of packets received during the data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five packets.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame. In such an embodiment, the updated polling packet 370 may or may not further adjust one or more of the allotted data packet number, allotted data packet length, or allotted data packet transmission time slots for the wireless IO device 380. For example, in an embodiment, the updated polling packet 370 identifying an updated time for initiation of a second, later data packet communication frame may also provide an updated allotted data packet number equivalent to the initial allotted data packet number. In another example, in an embodiment, the updated polling packet 370 may also provide an updated allotted data packet length equivalent to the initial allotted data packet length. In still another example, in an embodiment, the updated polling packet 370 may also provide updated allotted data packet time slots having the same positions within the second data packet communication frame as the positions of the initial allotted data packet transmission time slots within the first data packet communication frame 340. In other embodiments, as described in greater detail below with respect to FIG. 4A, 4B, or 4C, one or more of these values for the updated allotted data packet number, updated allotted data packet length, or updated allotted data packet transmission time slots may be changed or adjusted from the values of the initial allotted data packet number, initial allotted data packet length, or initial allotted data packet transmission time slots given within the initial polling packet 320 by the wireless IO device (e.g., 380).

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication dongle 330 or information handling system 300 and minimize the frequency with which switches between TX mode and RX mode are required. In such a way, the streamlined wireless communication packet polling and reception system may decrease the frequency of ACK data packets transmitted, and the frequency of mode-switching described above with respect to existing systems. This may decrease power consumed by rapid mode-switching, reduce latency and improve overall user experience and wireless IO device (e.g., 380) performance.

In a further aspect of an embodiment, the controller of the wireless communication dongle 330 or the information handling system 300 executing code instructions of the streamlined IO device wireless communication packet polling and reception system in an embodiment may determine that the wireless IO device 380 has failed to transmit a number of data packets equivalent to the initial allotted data packet number within the initial polling packet 320. This may occur, for example, if the wireless IO device 380 powers down or enters sleep mode during the data packet communication frame 340 from lack of use. In such a scenario, the controller of the wireless communication dongle 330 or the information handling system 300 executing code instructions of the streamlined IO device wireless communication packet polling and reception system in an embodiment may initiate a device responsiveness timer having a preset duration (e.g., two minutes, five minutes, ten minutes). If no further data packets are received from the wireless IO device 380 before the device responsiveness timer expires, this may indicate that the wireless IO device 380 has been powered down or entered a sleep mode. In such a case, the controller of the wireless communication dongle 330 or the information handling system 300 executing code instructions of the streamlined IO device wireless communication packet polling and reception system in an embodiment may terminate the wireless link with the wireless IO device 380 and return to the RX mode to scan multiple frequencies for incoming requests from other wireless IO devices to pair with the wireless communication dongle 330 or the information handling system 300.

Figure 4A:
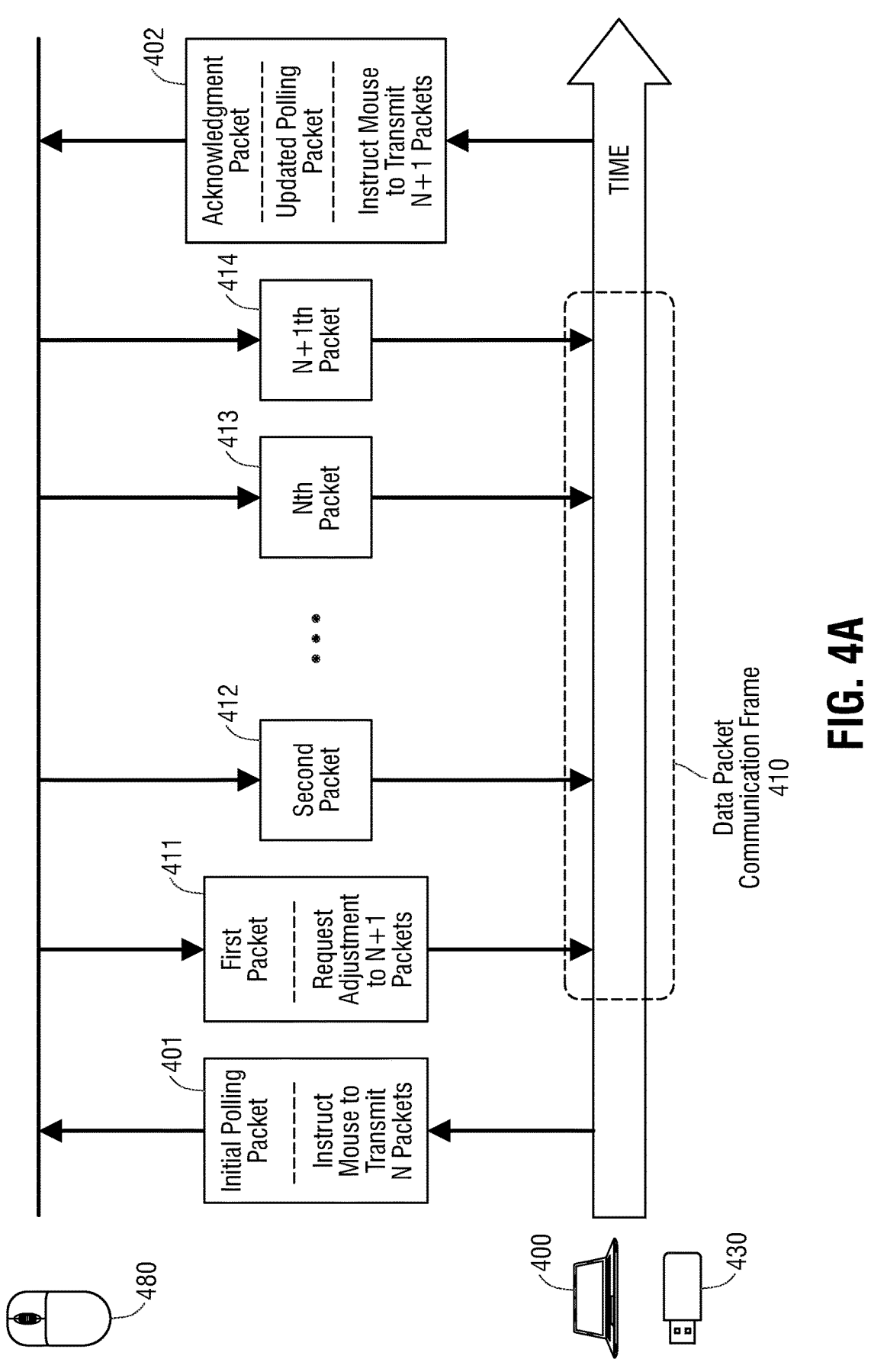
FIG. 4A is a block diagram illustrating a data packet communication frame between a wireless radio system and a wireless IO device requesting an increase in allotted data packet number or length according to an embodiment of the present disclosure.

FIG. 4A is a block diagram illustrating a data packet communication frame between a wireless communication dongle and a wireless IO device requesting an increase in allotted data packet number or length orchestrated with a controller of the wireless communications dongle executing code instructions of the streamlined IO device wireless communication packet polling and reception system and an agent executing at a controller at the wireless IO device according to an embodiment of the present disclosure. As described herein, the first packet 411 transmitted from a wireless IO device (e.g., 480) during a data packet communication frame 410 to a wireless radio system of a wireless communication dongle 430 or information handling system 400 pursuant to an initial poll packet 401 may include a request to adjust the initial allotted data packet number, initial allotted data packet length, or initial allotted data packet time slots identified within the initial poll packet 401. The initial polling packet 401 generated by a controller executing code instructions of the streamlined IO device wireless communication packet polling and reception system at a wireless communication dongle 430 or the information handling system 400 in an embodiment may instruct the wireless IO device 480 (e.g., mouse) to transmit an initial allotted data packet number having a value of N (e.g., five packets). In another aspect of an embodiment, the initial polling packet 401 may instruct the wireless IO device 480 to transmit data packets having an initial allotted data packet length (e.g., 23 Bytes). In yet another aspect of an embodiment, the initial polling packet 401 may instruct the wireless IO device 480 to transmit data packets within the first five of six time slots occurring every 0.0023 seconds within the data packet communication frame 410 which may be synchronized to begin at a specific time.

The wireless IO device 480 in an embodiment may respond to this initial polling packet 401 by transmitting, at the synchronized time at which the initial polling packet 401 indicates the data packet communication frame 410 is set to begin, a first data packet 411 in an embodiment. This first data packet 411 may comprise operational data (e.g., position of the mouse 480), and further include a request from the wireless IO device 480 (e.g., mouse) to increase the number or length of data packets or the number of time slots allocated to the wireless IO device 480 within the initial polling packet 401. For example, in an embodiment in which the initial polling packet 401 instructs the wireless IO device 480 (e.g., mouse) to transmit an initial allotted data packet number of N (e.g., five) during the data packet communication frame 410, the first data packet 411 may include a request from the wireless IO device 480 to transmit more packets (e.g., N+1 or six) or more packets (e.g., N−1 or four) than the initial allocated data packet number for that wireless IO device (e.g., 480) within the data packet communication frame 410. In another example, in an embodiment in which the initial polling packet 401 instructs the wireless IO device 480 (e.g., mouse) to transmit data packets having an initial allotted data packet length (e.g., 23 Bytes) or lesser length during the data packet communication frame 410, the first data packet 411 may include a request from the wireless IO device 480 to transmit packets of greater length (e.g., 46 Bytes) than the initial allocated data packet length within the data packet communication frame 410. As yet another example, in an embodiment in which the initial polling packet 401 instructs the wireless IO device 480 (e.g., mouse) to transmit data packets at the first of five initial allotted data packet time slots during the data packet communication frame 410, the first data packet 411 may include a request from the wireless IO device 480 to transmit packets at each of six time slots allocated in a dynamic readjustment at the wireless communication dongle 430 within that first data packet communication frame 410.

In an embodiment in which the wireless communication dongle 430 or the information handling system 400 is paired with only one wireless IO device (e.g., 480) during the data packet communication frame 410, accepting the requested adjustments described directly above may not present an increased risk of data packet transmission collision. In such a scenario, the controller of the wireless communication dongle 430 or the information handling system 400 executing code instructions of the streamlined IO device wireless communication packet polling and reception system in such an embodiment may accept the requested adjustment given within the first data packet 411 for application during the current data packet communication frame 410. The controller of the wireless communication dongle 430 or the information handling system 400 executing code instructions of the streamlined IO device wireless communication packet polling and reception system in such an embodiment may then receive a plurality of further data packets including operational data for the mouse 480 (e.g., positional data) within a second packet 412, an Nth packet 413 (e.g., fifth packet), and continue to receive an N+1th packet 414 (e.g., sixth packet) that exceeds the initial allotted data packet number given within the initial polling packet 401 for the current data packet communication frame 410.

The controller of the wireless communication dongle 430 or the information handling system 400 executing code instructions of the streamlined IO device wireless communication packet polling and reception system in an embodiment may then transmit an updated polling packet 402 containing an acknowledgement of receipt of N+1 packets (e.g., six) from the wireless IO device 480 and updated instructions for transmission of data packets during an upcoming second data packet communication frame between the wireless IO device 480 and the wireless communication dongle 430 or the information handling system 400. In an embodiment, the controller of the wireless communication dongle 430 or the information handling system 400 executing code instructions of the streamlined IO device wireless communication packet polling and reception system may further respond to the received requested adjustment within the data packet 411 by adjusting the number or length of data packets or time slots allotted for transfer by the wireless IO device 480 during an upcoming second data packet communication frame (not shown) after transmission of the updated polling packet 402.

For example, the updated polling packet 402 may instruct the wireless IO device 480 (e.g., mouse) to transmit the increased number or length of data packets or increase the number of time slots as requested within the first data packet 411 as a dynamic adjustment. More specifically, in an embodiment in which the wireless IO device 480 has requested to increase the initial allotted data packet number from five to six during the first data packet communication frame 410, the updated polling packet 402 may instruct the wireless IO device 480 to transmit an updated allotted data packet number of six (e.g., greater than the initial allotted data packet number of five) within the second, upcoming data packet communication frame. As another example, in an embodiment in which the wireless IO device 480 has requested to increase the initial allotted data packet length from 23 Bytes to 46 Bytes during the first data packet communication frame 410, the updated polling packet 402 may instruct the wireless IO device 480 to transmit an updated allotted data packet length of 46 Bytes (e.g., greater than the initial allotted data packet length of 23 Bytes) within the second, upcoming data packet communication frame.

Figure 4B:
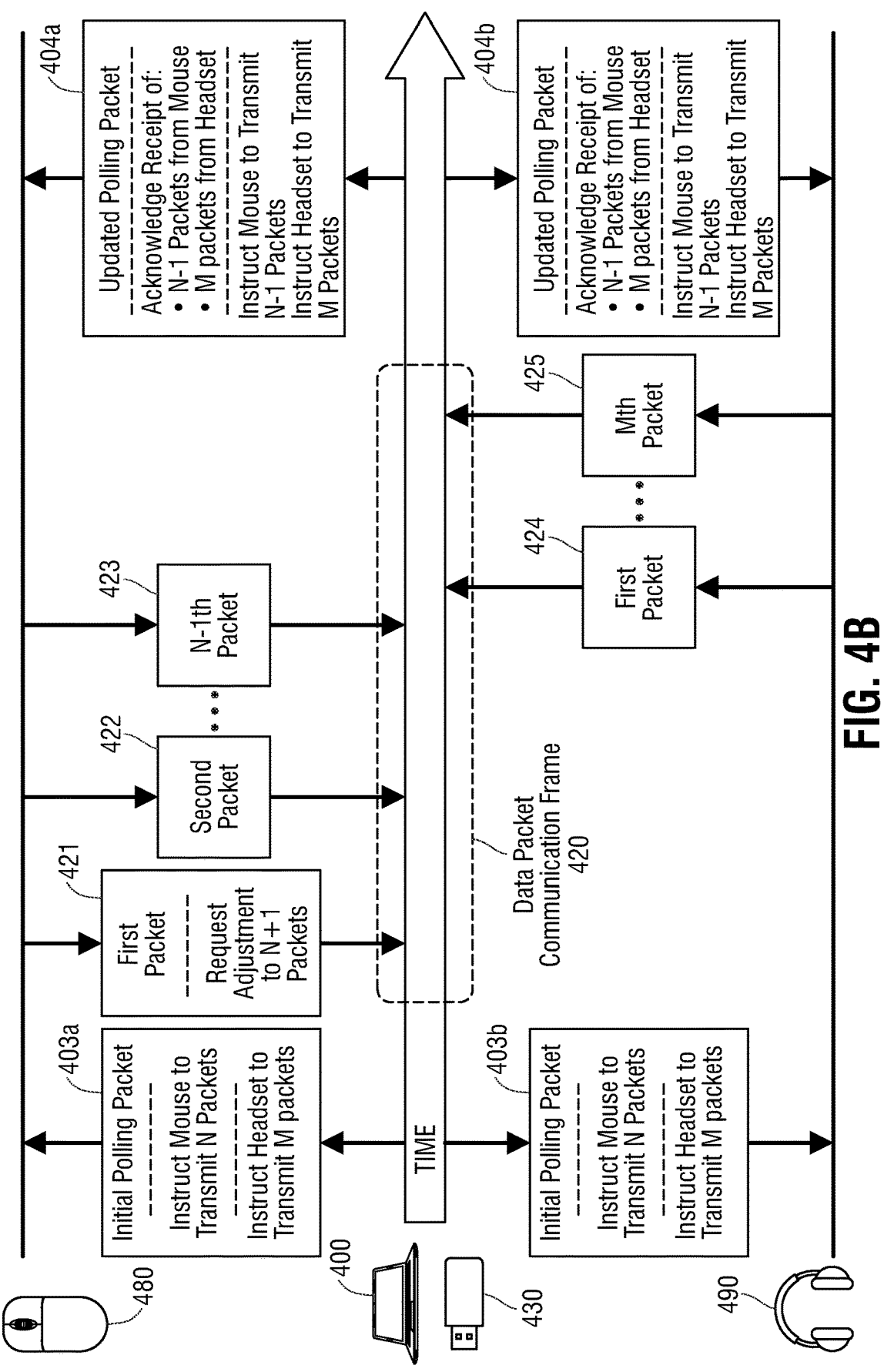
FIG. 4B is a block diagram illustrating a data packet communication frame between a wireless radio system, a first wireless IO device requesting a decrease in allotted data packet number or length, and a second wireless IO device according to an embodiment of the present disclosure.

FIG. 4B is a block diagram illustrating a data packet communication frame between a wireless communication dongle, a first wireless IO device, and a second wireless IO device that is orchestrated by a controller of the wireless communications dongle executing code instructions of the streamlined IO device wireless communication packet polling and reception system according to an embodiment of the present disclosure. As described herein, the wireless communication dongle 430 or the information handling system 400 may pair wirelessly with a plurality of wireless IO devices (e.g., mouse 480 and headset or keyboard 490) simultaneously within a single data packet communication frame 420. In such an embodiment, the controller of the wireless communication dongle 430 or the information handling system 400 may instruct a wireless radio system to transmit the initial polling packet (e.g., 403a and 403b) to both the paired wireless IO devices (e.g., 480 and 490) simultaneously. Although the initial polling packet 403a and 403b appear as separate packets within FIG. 4B, 403a and 403b represent the same initial polling packet being received by two separate wireless IO devices 480 and 490, respectively.

Such an initial polling packet 403a or 403b may provide instructions for transmission of data packets from both the mouse 480 and the headset or keyboard 490 in an embodiment. For example, the initial polling packet 403a or 403b may identify an initial first wireless IO device allotted data packet number instructing the mouse 480 to transmit an initial allotted data packet number of N equivalent to five and may identify an initial second wireless IO device allotted data packet number instructing the headset or keyboard 490 to transmit an initial allotted data packet number M of one in the data packet communication frame 420. As another example, the initial polling packet 403a and 403b may identify an initial first wireless IO device allotted data packet length instructing the mouse 480 to transmit data packets having an initial allotted data packet length of 46 Bytes and may identify an initial second wireless IO device allotted data packet length instructing the headset or keyboard 490 to transmit data packets having an initial allotted data packet length of 69 Bytes in the data packet communication frame 420. In yet another example, the initial polling packet 403a or 403b may identify initial first wireless IO device allotted data packet transmission time slots instructing the mouse 480 to transmit data packets at the first N=five available time slots of six time slots (e.g., N+M) and may identify an initial second wireless IO device allotted data packet transmission time slot instructing the headset or keyboard 490 to transmit a data packet within the sixth of six available time slots (e.g., N+M) within the data packet communication frame 420. Because both the first wireless IO device 480 (e.g., mouse) and the second wireless IO device 490 (e.g., headset) receive the same initial polling packet (e.g., 403a or 403b, which may be identical), the first wireless IO device 480 and the second wireless IO device 490 may be notified via the initial polling packet (e.g., 403a or 403b) that the wireless communication dongle 430 or the information handling system 400 may be receiving data packets from two separate wireless IO devices (e.g., 480 and 490) during the same data packet communication frame 420 in such an embodiment.

As described herein, the first packet 421 transmitted from a wireless IO device (e.g., 480) during a data packet communication frame 420 to a wireless radio system of a wireless communication dongle 430 or information handling system 400 may include a request to adjust the initial allotted data packet number, initial allotted data packet length, or initial allotted data packet time slots identified within an initial poll packet 403a. For example, the first packet 421 transmitted from a wireless IO device (e.g., 480) during a data packet communication frame 420 to a wireless radio system of a wireless communication dongle 430 or information handling system 400 may include a request from the mouse 480 to decrease the number of packets transmitted from the mouse 480 (e.g., to N−1 packets) during the data packet communication frame 420 below the initial allotted data packet number N identified within the initial poll packet 403a. As another example, the first packet 421 transmitted from a wireless IO device (e.g., 480) during a data packet communication frame 420 to a wireless radio system of a wireless communication dongle 430 or information handling system 400 may include a request from the mouse 480 to decrease the length of packets transmitted from the mouse 480 (e.g., to 23 Bytes) during the data packet communication frame 420 below the initial allotted data packet length (e.g., 46 Bytes) identified within the initial poll packet 403a. In yet another example, the first packet 421 transmitted from a wireless IO device (e.g., 480) during a data packet communication frame 420 to a wireless radio system of a wireless communication dongle 430 or information handling system 400 may include a request from the mouse 480 to decrease the number of data packet transmission time slots allotted to the first wireless IO device 480 during the data packet communication frame 420 packets (e.g., to four), which may be less than the initial allotted data packet transmission time slots (e.g., five) identified within the initial poll packet 403a.

In an embodiment in which the wireless communication dongle 430 or the information handling system 400 is paired with more than one wireless IO device (e.g., 480) during the data packet communication frame 420, accepting the requested adjustments to decrease described directly above may not present an increased risk of data packet transmission collision, because the first wireless IO device 480 is requesting to transmit fewer data packets, data packets of shorter length, or transmission during fewer time slots than initially allotted will not affect the second wireless IO device 490 data packets in the data packet communication frame 420. In other words, accepting such requested adjustments may not impact the receipt of data packets from the second wireless IO device 490, as instructed within the initial polling packet 403b.

In such a scenario, the controller of the wireless communication dongle 430 or the information handling system 400 executing code instructions of the streamlined IO device wireless communication packet polling and reception system in an embodiment may accept the requested adjustment given within the first data packet 421 to dynamically adjust at least a portion of the current data packet communication frame 420. The wireless communication dongle 430 or the information handling system 400 then receive a plurality of further data packets from the first wireless IO device 480 including operational data for the mouse 480 (e.g., mouse positional data) within a second packet 412 and up to an N−1th packet 423 (e.g., fourth packet) that is less than the initial allotted data packet number given within the initial polling packet 403a. Following receipt of the N−1th packet 423 from the first wireless IO device 480 in an embodiment, the wireless communication dongle 430 or the information handling system 400 then receive one or more data packets (e.g., first packet 424 up to Mth packet 425) from the second wireless IO device 490. In such a way, the controller of the wireless communication dongle 430 or the information handling system 400 may orchestrate delivery of a plurality of data packets from a plurality of paired wireless IO devices (e.g., 480 and 490) with dynamic adjustments during the same data packet communication frame 420 according to instructions given within a single initial polling packet (e.g., 403a or 403b).

The controller of the wireless communication dongle 430 or the information handling system 400 executing code instructions of the streamlined IO device wireless communication packet polling and reception system in an embodiment may then transmit an updated polling packet (e.g., 404a and 404b) containing an acknowledgement of receipt of N−1 packets (e.g., four) from the wireless IO device 480 and acknowledgement of M packets (e.g., one) from wireless IO device 490 in an embodiment. Further, updated polling packet 404a and 404b may include updated instructions for transmission of data packets during an upcoming second data packet communication frame between the first wireless IO device 480, the second wireless device 490, and the wireless communication dongle 430 or the information handling system 400. Although the updated polling packet 404a and 404b appear as separate packets within FIG. 4B, 404a and 404b represent the same updated polling packet being received by two separate wireless IO devices 480 and 490, respectively.

In an embodiment, the controller of the wireless communication dongle 430 or the information handling system 400 executing code instructions of the streamlined IO device wireless communication packet polling and reception system may further respond to the received requested adjustment within the data packet 421 by adjusting the number or length of data packets or time slots allotted for transfer by the wireless IO device 480 to N−1 during the upcoming second data packet communication frame. In some embodiments, the streamlined wireless communication packet polling and reception system may only make this dynamic adjustment to N−1 for the first wireless IO device requested adjustment at the second upcoming data packet communication frame. For example, the updated polling packet (e.g., 404a and 404b) may instruct the wireless IO device 480 (e.g., mouse) to transmit the decreased number or length of data packets or decrease the number of time slots as requested within the first data packet 421. More specifically, in an embodiment in which the wireless IO device 480 has requested to decrease the initial allotted data packet number from five to four during the first data packet communication frame 420, the updated polling packet (e.g., 403*a*) may instruct the wireless IO device 480 to transmit an updated allotted data packet number of four (e.g., less than the initial allotted data packet number of five) within the second, upcoming data packet communication frame. As another example, in an embodiment in which the wireless IO device 480 has requested to decrease the initial allotted data packet length from 46 Bytes to 23 Bytes during the first data packet communication frame 420, the updated polling packet 404*a* may instruct the wireless IO device 480 to transmit an updated allotted data packet length of 23 Bytes (e.g., less than the initial allotted data packet length of 46 Bytes) within the second, upcoming data packet communication frame. In yet another example, in an embodiment in which the wireless IO device 480 has requested to decrease the initial allotted data packet time slots from five to four during the first data packet communication frame 420, the updated polling packet 404*a* may instruct the wireless IO device 480 to transmit data packets at updated allotted data packet time slots equivalent to only four of the six available data slots within the second, upcoming data packet communication frame.

Figure 4C:
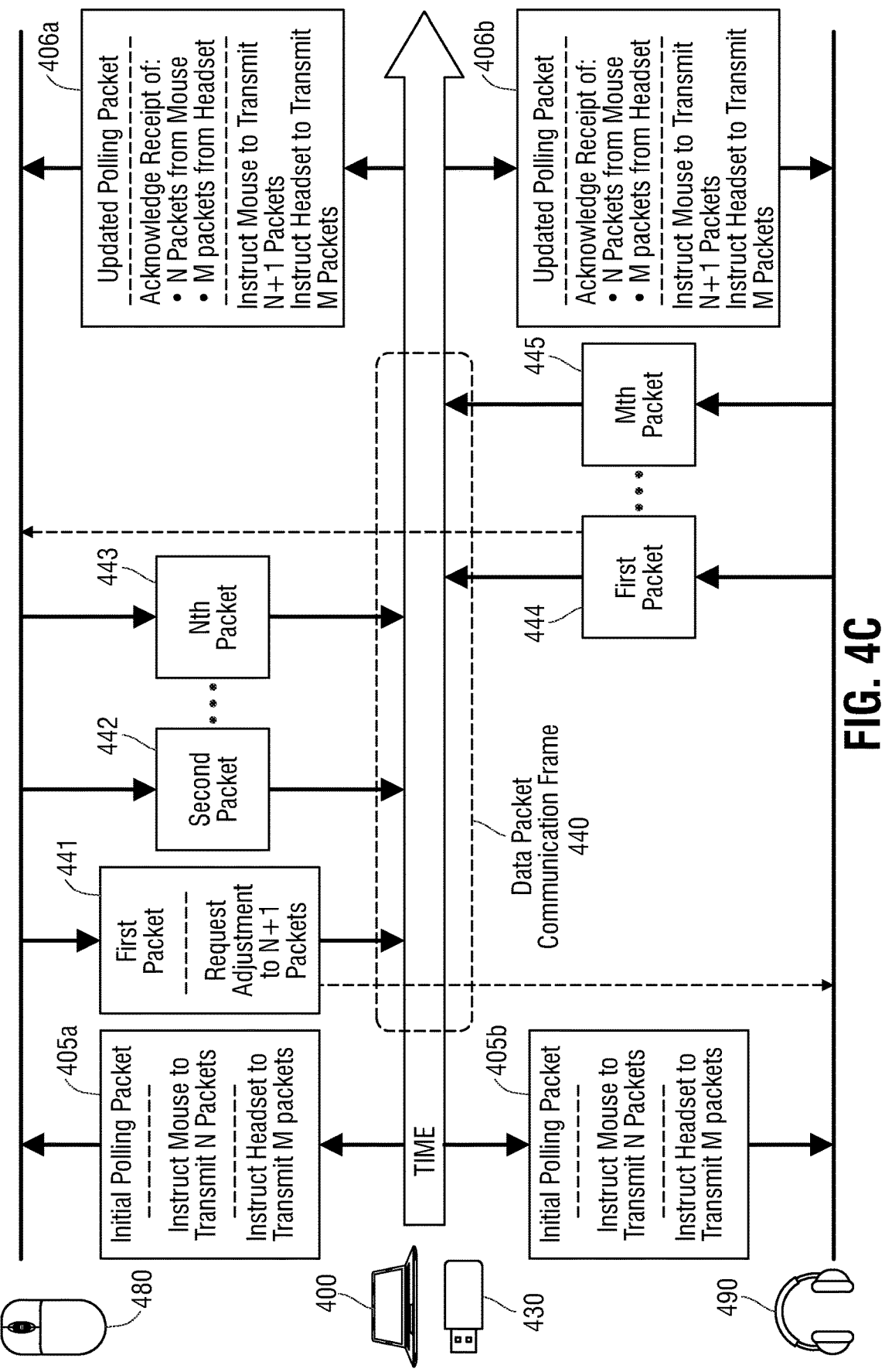
FIG. 4C is a block diagram illustrating a data packet communication frame between a wireless radio system, a first wireless IO device requesting an increase in allotted data packet number or length, and a second wireless IO device according to an embodiment of the present disclosure.

FIG. 4C is a block diagram illustrating a data packet communication frame between a wireless communication dongle a first wireless IO device, a second wireless IO device, and a wireless communication dongle orchestrated by a controller of the wireless communications dongle executing code instructions of the streamlined IO device wireless communication packet polling and reception system according to another embodiment of the present disclosure. As described herein, the wireless communication dongle 430 or the information handling system 400 may pair wirelessly with a plurality of wireless IO devices (e.g., mouse 480 and headset or keyboard 490) simultaneously within a single data packet communication frame 440. In such an embodiment, the controller of the wireless communication dongle 430 or the information handling system 400 may instruct a wireless radio system to transmit the initial polling packet (e.g., 405*a* or 405*b*) to both the paired wireless IO devices (e.g., 480 and 490) simultaneously. Although the initial polling packet 405*a* and 405*b* appear as separate packets within FIG. 4C. 405*a* and 405*b* represent the same initial polling packet being received by two separate wireless IO devices 480 and 490, respectively.

Such an initial polling packet 405*a* and 405*b* may provide instructions for transmission of data packets from both the mouse 480 and the headset or keyboard 490 in an embodiment. For example, the initial polling packet 405*a* or 405*b* may identify an initial first wireless IO device allotted data packet number instructing the mouse 480 to transmit an initial allotted data packet number of N=five and may identify an initial second wireless IO device allotted data packet number instructing the headset or keyboard 490 to transmit an initial allotted data packet number of M=one. As another example, the initial polling packet 405*a* or 405*b* may identify an initial first wireless IO device allotted data packet length instructing the mouse 480 to transmit data packets having an initial allotted data packet length of 23 Bytes and may identify an initial second wireless IO device allotted data packet length instructing the headset or keyboard 490 to transmit data packets having an initial allotted data packet length of 69 Bytes. In yet another example, the initial polling packet 405*a* or 405*b* may identify initial first wireless IO device allotted data packet transmission time slots instructing the mouse 480 to transmit data packets at the first five available time slots and may identify an initial second wireless IO device allotted data packet transmission time slot instructing the headset or keyboard 490 to transmit a data packet within the sixth of six available time slots within the data packet communication frame 440. Because both the first wireless IO device 480 (e.g., mouse) and the second wireless IO device 490 (e.g., headset) receive the same initial polling packet (e.g., 405*a* and 405*b*, which may be identical), the first wireless IO device 480 and the second wireless IO device 490 may be notified via the initial polling packet (e.g., 405*a* or 405*b*) that the wireless communication dongle 430 or the information handling system 400 may be receiving data packets from two separate wireless IO devices (e.g., 480 and 490) during the same data packet communication frame 440 in an embodiment.

As described herein, the first packet 441 transmitted from a wireless IO device (e.g., 480) during a data packet communication frame 440 to a wireless radio system of a wireless communication dongle 430 or information handling system 400 may include a request to adjust the initial allotted data packet number, initial allotted data packet length, or initial allotted data packet time slots identified within an initial poll packet 405*a*. Such a requested adjustment may increase or decrease the number of packets for the first wireless IO device 480. For example, the first packet 441 transmitted from a wireless IO device (e.g., 480) during a data packet communication frame 440 to a wireless radio system of a wireless communication dongle 430 or information handling system 400 may include a request from the mouse 480 to increase the number of packets transmitted from the mouse 480 (e.g., to N+1 packets) during the data packet communication frame 440 above the initial allotted data packet number identified within the initial poll packet 405*a*. As another example, the first packet 441 transmitted from a wireless IO device (e.g., 480) during a data packet communication frame 440 to a wireless radio system of a wireless communication dongle 430 or information handling system 400 may include a request from the mouse 480 to increase the length of packets transmitted from the mouse 480 (e.g., to 46 Bytes) during the data packet communication frame 440 above the initial allotted data packet length (e.g., 23 Bytes) identified within the initial poll packet 405*a*. In yet another example, the first packet 441 transmitted from a wireless IO device (e.g., 480) during a data packet communication frame 440 to a wireless radio system of a wireless communication dongle 430 or information handling system 400 may include a request from the mouse 480 to increase the number of data packet transmission time slots allotted to the first wireless IO device 480 during the data packet communication frame 440 packets (e.g., to six), which may be greater than the initial allotted data packet transmission time slots (e.g., five) identified within the initial poll packet 405*a*.

In an embodiment in which the wireless communication dongle 430 or the information handling system 400 is paired with more than one wireless IO device (e.g., 480 and 490) during the data packet communication frame 440, accepting the requested adjustments described directly above may present an increased risk of data packet transmission collision, because the first wireless IO device 480 is requesting to transmit data packets during a time that has been already allotted to transmission of data packets from the second wireless IO device 490. For example, a request to increase the number of data packets transmitted or the number of time slots at which those data packets are transmitted from the first wireless IO device 480 would require the wireless communication dongle 430 or the information handling system 400 to receive data packets from the first wireless IO device 480 during the sixth of six available time slots within the data packet communication frame 440, which may have already been allotted for transmission of data packets from the second wireless IO device 490 within the initial polling packet 405*b*. Because the first wireless IO device 480 is notified within the initial polling packet 405*a* that a second wireless IO device 490 is also transmitting data packets within the data packet communication frame 440, the first wireless IO device 480 may adhere to the initial, unadjusted instructions given within the initial polling packet 405*a* during the data packet communication frame 440 to avoid risk of data packet transmission collision. In such an embodiment, the requested adjustment given within the first data packet 441 transmitted by the first wireless IO device 480 during the data packet communication frame 440 may act as a request to adjust allotted transmission values during an upcoming, future data packet communication frame following data packet communication frame 440 and after updated polling packet 404*a* and 404*b* are transmitted.

In another example embodiment, the initial polling packet (e.g., 405*a* or 405*b*) may instruct the first wireless IO device 480 to send N=4 packets of a first wireless IO device initially specified data packet length (e.g., 8 bytes or 16 bytes), and instruct the second wireless IO device 490 to send M=2 packets of a second wireless IO device initially specified data packet length (e.g., 8 bytes or 16 bytes). In such an example embodiment, the second wireless IO device 490 may receive the first data packet 441 from the first wireless IO device 480 while listening on the same frequency channel upon which the first wireless IO device 480 is transmitting data to the wireless communication dongle 430. The second wireless IO device 490 in such an example embodiment may identify the requested adjustment to N+1 data packets sent to the wireless communication dongle 430 in the first data packet 441, and make adjustments to its data packet transmission timing in order to accommodate the requested increase in data packets from the first wireless IO device 480. For example, the second wireless IO device 490 may transmit during only one of its two allotted time slots during the data packet communication frame 440. In other words, instead of transmitting the first packet 444 and the second packet 445, both of the second wireless IO device initially specified data packet length (e.g., 8 bytes or 16 bytes), the second wireless IO device 490 may transmit only one data packet (e.g., during the Mth packet time slot at 445) that has a data packet length that is twice that of the second wireless IO device initially specified data packet length. More specifically, instead of sending two separate data packets of 8 bytes or 16 bytes each, the second wireless IO device may send a single data packet at 445 having a data packet length of 16 bytes, or 32 bytes, respectively. In such a way, the second wireless IO device may respond to the first wireless IO device requested adjustment on the fly by pushing transmission of data packets during the time slot requested by the first wireless IO device to another time slot assigned to the second wireless IO device.

In still another embodiment, the second wireless IO device 490 may, within the first data packet 444, request additional time slots for transmission of more packets (e.g., M+1) than are currently allotted to the second wireless IO device within the data packet communication frame 440. In such an example embodiment, the first wireless IO device 480 may receive the first data packet 441 from the second wireless IO device 490 while listening on the same frequency channel upon which the second wireless IO device

490 is transmitting data to the wireless communication dongle 430. The first wireless IO device 480 in such an example embodiment may identify the requested adjustment to M+1 data packets sent to the wireless communication dongle 430 in the first data packet 444, and make adjustments to the timing during which it expects to receive the updated polling packet in order to accommodate the requested increase in data packets from the second wireless IO device 490. For example, the first wireless IO device 480 may expect the wireless communication dongle 430 or the information handling system 400 to extend the duration of the data packet communication frame 440 to accommodate the second wireless IO device 490 request to send an additional data packet (e.g., M+1) in a time slot following the allotted time slot during which the second wireless IO device transmits the Mth packet 445. In such a case, the first wireless IO device may switch to RX mode to receive the updated polling packet 406*a* following this extended data packet communication frame 440 (e.g., allowing room for an extra time slot between transmission of the Mth data packet 445 and the updated polling packet 406*a*).

The wireless communication dongle 430 or the information handling system 400 may then receive a plurality of further data packets from the first wireless IO device 480 including operational data for the mouse 480 (e.g., positional data) within a second packet 442 and up to an Nth packet 443 (e.g., fifth packet) that is equivalent to the initial allotted data packet number given within the initial polling packet 405*a*. Following receipt of the Nth packet 443 from the first wireless IO device 480 in an embodiment, the wireless communication dongle 430 or the information handling system 400 then receive one or more data packets (e.g., first packet 444 up to Mth packet 445) from the second wireless IO device 490. In such a way, the controller of the wireless communication dongle 430 or the information handling system 400 may orchestrate delivery of a plurality of data packets from a plurality of paired wireless IO devices (e.g., 480 and 490) during the same data packet communication frame 440 according to instructions given within a single initial polling packet (e.g., 405*a* or 405*b*) but still accommodate any dynamic adjustments requested by the wireless IO devices 480 or 490.

The controller of the wireless communication dongle 430 or the information handling system 400 executing code instructions of the streamlined IO device wireless communication packet polling and reception system in an embodiment may then transmit an updated polling packet (e.g., 406*a* and 406*b*) containing an acknowledgement of receipt of N packets (e.g., five) from the wireless IO device 480 and receipt of M packets from wireless IO device 490. The updated polling packet 406*a* and 406*b* may also include updated instructions for transmission of data packets during an upcoming second data packet communication frame between the first wireless IO device 480, the second wireless device 490, and the wireless communication dongle 430 or the information handling system 400. Although the updated polling packet 406*a* and 406*b* appear as separate packets within FIG. 4C, 406*a* and 406*b* represent the same updated polling packet being received by two separate wireless IO devices 480 and 490, respectively. In an embodiment, the controller of the wireless communication dongle 430 or the information handling system 400 executing code instructions of the streamlined IO device wireless communication packet polling and reception system may further respond to the received requested adjustment within the data packet 441 by adjusting the number or length of data packets or time slots allotted for transfer by the wireless IO device 480 during an upcoming second data packet communication frame. This may also adjust the overall number of packets received from both wireless IO devices 480 and 490 in the second data packet communication frame.

For example, the updated polling packet (e.g., 406a and 406b) may instruct the wireless IO device 480 (e.g., mouse) to transmit the increased number or length of data packets or increase the number of time slots as requested within the first data packet 441. More specifically, in an embodiment in which the wireless IO device 480 has requested to increase the initial allotted data packet number from five to six during the second data packet communication frame, the updated polling packet (e.g., 406a) may instruct the wireless IO device 480 to transmit an updated allotted data packet number of N+1=six (e.g., greater than the initial allotted data packet number of N=five) within the second, upcoming data packet communication frame. The total second data packet communication frame may also be increased in duration to accommodate receipt of N+1+M packets (e.g., seven) in updated polling packet 406a and 406b in such an example embodiment. As another example, in an embodiment in which the wireless IO device 480 has requested to increase the initial allotted data packet length from 23 Bytes to 46 Bytes during the first data packet communication frame 440, the updated polling packet 406a may instruct the wireless IO device 480 to transmit an updated allotted data packet length of 46 Bytes (e.g., greater than the initial allotted data packet length of 23 Bytes) within the second, upcoming data packet communication frame. In yet another example, in an embodiment in which the wireless IO device 480 has requested to increase the initial allotted data packet time slots from five to six during the first data packet communication frame 440, the updated polling packet 406a may instruct the wireless IO device 480 to transmit data packets at updated allotted data packet time slots equivalent to six of seven available time slots within the second, upcoming data packet communication frame.

Figure 5:
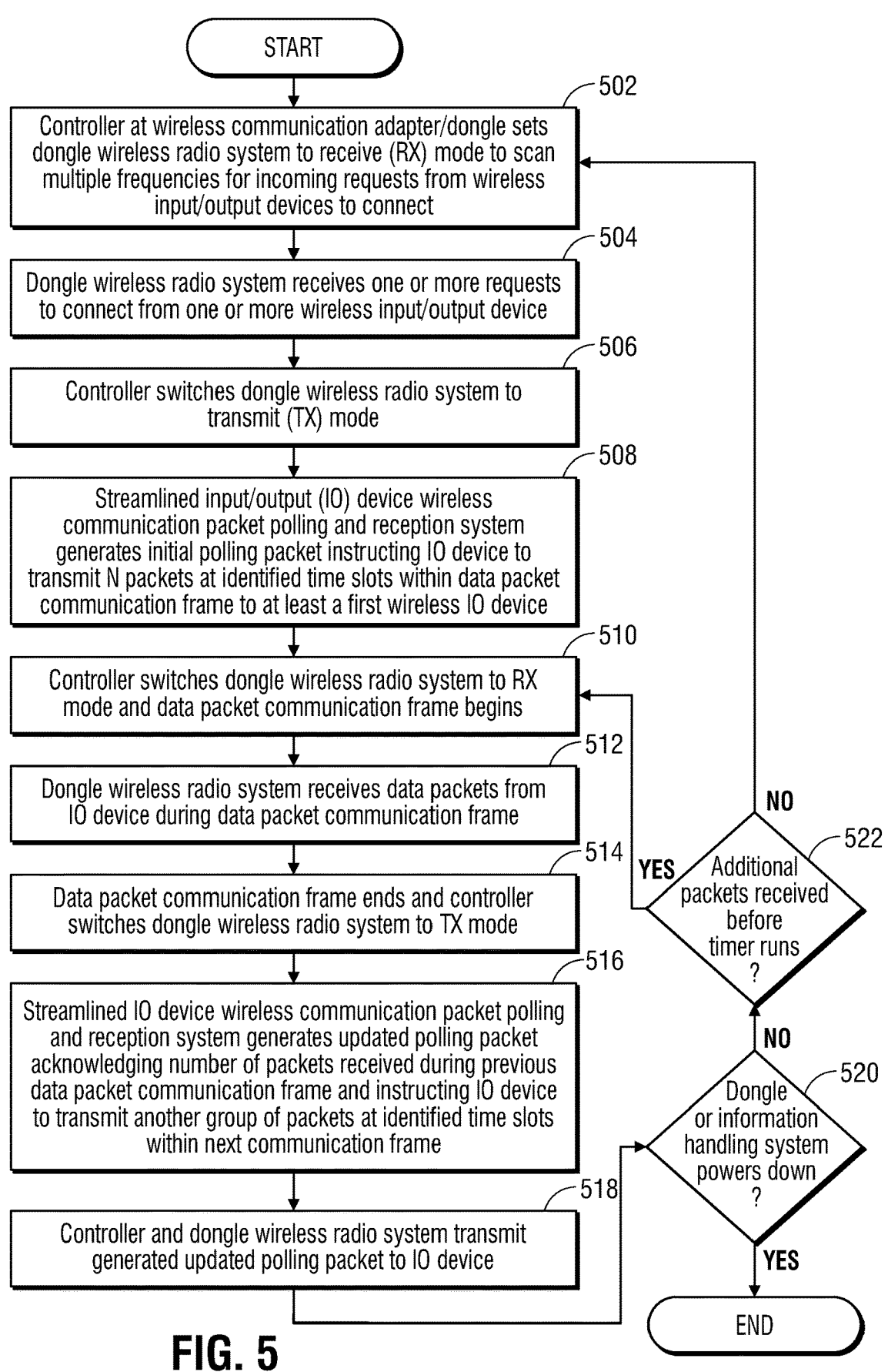
FIG. 5 is a flow diagram illustrating a method of orchestrating transmission of data packets from one or more wireless IO devices to a wireless radio adaptor or wireless communication dongle according to an embodiment of the present disclosure.

FIG. 5 is a flow diagram illustrating a method of orchestrating transmission of data packets from one or more wireless IO devices to a wireless communication dongle during a data packet communication frame to decrease power consumption, risk of data packet collision, and latency according to an embodiment of the present disclosure. As described herein, many manufacturers of wireless IO devices (e.g., mouse, keyboard, headset, virtual reality peripheral devices) for pairing wirelessly with an information handling system build these devices to provide the most basic or rudimentary communication capabilities that comply with, for example, the Bluetooth® Low Energy (BLE) communication standard. For example, many existing wireless IO devices are designed to communicate with a wireless communications dongle using a one reception/one transmission (1RX/1TX) format in which each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example.

Each of these transmission/reception mode switches consumes power, causes delay and reduced throughput, and increases potential for collision between incoming wireless IO device data packets and outgoing ACK data packets. This may further cause the customer to experience reduced performance between their input via the wireless IO device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1RX/1TX approach may fail to meet customer needs for operational data throughput during execution of latency-sensitive software applications such as gaming applications or other high definition audio/visual applications. The streamlined wireless communication packet polling and reception system in an embodiment may orchestrate scheduled reception of a plurality of data packets from each of a plurality of wireless IO devices between transmission of ACK data packets to each of those wireless IO devices to provide higher data throughputs and improved performance while also reducing energy waste.

At block 502, a controller for a wireless communication dongle or a network interface device for an information handling system may set a wireless radio system to a receive (RX) mode in an embodiment. While in this RX mode in an embodiment, the wireless radio system may scan multiple frequencies for incoming pairing requests from one or more wireless IO devices. For example, in an embodiment described with respect to FIG. 3, a wireless radio system of the wireless communications dongle 330 or the information handling system 300 may scan a plurality of frequencies at which wireless IO devices (e.g., 380) may be expected to transmit requests to connect with the dongle 330 or the information handling system 300. In some embodiments, this may include only a few (e.g., two or three) frequency channels upon which the wireless communication dongle 330 or information handling system 300 may be expecting to receive a request to connect (e.g., 310) from one or more wireless IO devices (e.g., 380), as established during initial pairing of such a wireless IO device (e.g., 380) with the wireless communication dongle 330 or the information handling system 300.

The wireless radio system in an embodiment at block 504 may receive one or more requests to connect from one or more wireless IO devices. For example, while in this RX mode, the wireless radio system of the wireless communications dongle 330 or the information handling system 300 may receive a request to connect 310 with the wireless communications dongle 330 or the information handling system 300. This connection request 310 in some embodiments may include an identification of the model number or various default communication metrics for the mouse 380 or other identifying information for the mouse 380 that the wireless communications dongle 330 or the information handling system 300 may use to access stored information identifying such default communications metrics. For example, the connection request 310 may include a standard data packet transmission rate (e.g., 6,000 packets per second), or standard data packet transmission length (e.g., 23 bytes or 184 bits) for the mouse 380. As another example, the connection request 310 may include identification for the mouse 380 that is associated with a profile stored at the wireless communications dongle 330 or the information handling system 300 providing such standard data packet transmission rate or standard data packet transmission length or capabilities of the mouse for data throughput levels.

At block 506, the controller of the wireless communication dongle or the information handling system may switch the wireless radio system to a transmit (TX) mode for transmission of an initial polling packet for synchronizing delivery of data packets between the wireless IO device and the wireless communication dongle or information handling system. For example, upon successful receipt of the connection requested at block 504 above, the wireless communications dongle 330 or the information handling system 300 may switch to a transmit (TX) mode.

The controller of the wireless communications dongle or the information handling system executing code instructions of the streamlined IO device wireless communication packet polling and reception system in an embodiment at block 508 may generate an initial polling packet. For example, the controller of the wireless communications dongle 330 or the information handling system 300 executing code instructions of the streamlined IO device wireless communication packet polling and reception system in an embodiment may generate an initial polling packet 320 that instructs each of the wireless IO devices (e.g., 380) paired with the wireless communications dongle 330 or the information handling system 300 to transmit a plurality of data packets of a specified length and at specified time slots during a first data packet communication frame between the wireless communications dongle 330 or the information handling system 300 and each of the paired wireless IO devices (e.g., 380). The controller of the wireless communications dongle 330 or the information handling system 300 executing code instructions of the streamlined IO device wireless communication packet polling and reception system in an embodiment may determine an initial allotted data packet number, initial allotted data packet length, or initial allotted data packet transmission time slots for receipt of data packets transmitted from the wireless IO device 380 based on default initial values that apply to any paired wireless IO device 380 or to a wireless IO device 380 identifiable based on information given within the request to connect received at block 504. For example, the controller of the wireless communications dongle 330 or the information handling system 300 executing code instructions of the streamlined IO device wireless communication packet polling and reception system may determine an initial allotted data packet number of N=five, initial allotted data packet length of 23 bytes (B), or initial allotted data packet transmission time slots of N=5 time slots every 0.000167 seconds (e.g., 167 μs) for receipt of data packets transmitted from the wireless IO device 380 within a data packet communication frame having a total length of 0.000833 seconds or about 1 μs. The controller of the wireless communications dongle 330 or the information handling system 300 may instruct the wireless radio system to transmit an initial polling packet 320 containing the initial allotted data packet number, the initial allotted data packet length, and initial allotted data packet transmission time slots to the wireless IO device or devices (e.g., 380). This initial polling packet 320 in an embodiment may synchronize communication between the wireless communications dongle 330 or the information handling system 300 and the wireless IO device 380 for a data packet communication frame beginning at a specified time and having the specified duration (e.g., 0.0138 seconds) and number of packets N (e.g., N=5).

In another example embodiment described above with respect to FIG. 4A, the initial polling packet 401 generated by a controller executing code instructions of the streamlined IO device wireless communication packet polling and reception system at a wireless communication dongle 430 or the information handling system 400 in an embodiment may instruct the wireless IO device 480 (e.g., mouse) to transmit an initial allotted data packet number having a value of N=5 (e.g., five packets). In another aspect of an embodiment, the initial polling packet 401 may instruct the wireless IO device 480 to transmit data packets having an initial allotted data packet length (e.g., 23 Bytes). In yet another aspect of an embodiment, the initial polling packet 401 may instruct the wireless IO device 480 to transmit data packets within the first five of six time slots occurring every 0.0023 seconds within the data packet communication frame 410 which may be synchronized to begin at a specific time.

In yet another example embodiment described above with respect to FIG. 4B, the initial polling packet 403a or 403b may identify an initial first wireless IO device allotted data packet number instructing the mouse 480 to transmit an initial allotted data packet number of N=five and may identify an initial second wireless IO device allotted data packet number instructing the headset or keyboard 490 to transmit an initial allotted data packet number of M=one. As another example, the initial polling packet 403a or 403b may identify an initial first wireless IO device allotted data packet length instructing the mouse 480 to transmit data packets having an initial allotted data packet length of 46 Bytes and may identify an initial second wireless IO device allotted data packet length instructing the headset or keyboard 490 to transmit data packets having an initial allotted data packet length of 69 Bytes. In yet another example, the initial polling packet 403a or 403b may identify initial first wireless IO device allotted data packet transmission time slots instructing the mouse 480 to transmit data packets at the first N=five available time slots and may identify an initial second wireless IO device allotted data packet transmission time slot instructing the headset or keyboard 490 to transmit a data packet within the sixth of N+M=6 time slots available time slots within the data packet communication frame 420.

In still another example embodiment described above with respect to FIG. 4C, the initial polling packet 405a or 405b may identify an initial first wireless IO device allotted data packet number instructing the mouse 480 to transmit an initial allotted data packet number of N=five and may identify an initial second wireless IO device allotted data packet number instructing the headset or keyboard 490 to transmit an initial allotted data packet number of M=one. As another example, the initial polling packet 405a or 405b may identify an initial first wireless IO device allotted data packet length instructing the mouse 480 to transmit data packets having an initial allotted data packet length of 23 Bytes and may identify an initial second wireless IO device allotted data packet length instructing the headset or keyboard 490 to transmit data packets having an initial allotted data packet length of 69 Bytes. In yet another example, the initial polling packet 405a or 405b may identify initial first wireless IO device allotted data packet transmission time slots instructing the mouse 480 to transmit data packets at the first N=five available time slots and may identify an initial second wireless IO device allotted data packet transmission time slot instructing the headset or keyboard 490 to transmit a data packet within the sixth of N+M=6 time slots available time slots within the data packet communication frame 440.

At block 510, the controller for the wireless communication dongle or the information handling system may switch the wireless radio system to RX mode for receipt of a first data packet within a data packet communication frame. For example, in an embodiment described with respect to FIG. 3, upon transmission of the initial polling packet 320 in an embodiment, the controller for the wireless communications dongle 330 or the information handling system 300 may switch the wireless radio system into a receive mode to await the beginning of the data packet communication frame 340 with the wireless IO device 380. At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a length equivalent to the initial allotted data packet length of 23 Bytes and may be delivered at the synchronized time designating the beginning of the data packet communication frame 340 within the first of five initial allotted data packet transmission time slots, as defined within the initial polling packet 320. In other embodiments, as described in greater detail with respect to FIGS. 4A, 4B, 4C, and FIG. 6 below, this first packet 350 may further include a request to adjust the initial allotted data packet number, initial allotted data packet length, or initial allotted data packet time slots.

The wireless radio system of the wireless communication dongle or information handling system in an embodiment at block 512 may receive a plurality of data packets from one or more wireless IO devices during a first data packet communication frame. For example, during the data packet communication frame 340 in an embodiment, the wireless radio system of the wireless communication dongle 330 or the information handling system 300 may receive a plurality of data packets equivalent to the initial allotted data packet number N or M as defined within the initial polling packet 320. More specifically, in an embodiment in which the initial polling packet 320 identified an initial allotted data packet number of N=five, the Nth packet 360 received by the wireless radio system of the wireless communication dongle 330 or the information handling system 300 may be the fifth of five data packets transmitted during the data packet communication frame 340 from the wireless IO device 380 to the wireless communication dongle 330 or the information handling system 300. Each of the five data packets transmitted to the wireless communication dongle 330 or the information handling system 300 in an embodiment may have the initial allotted data packet number and initial allotted data packet length and may be transmitted at the designated initial allotted data packet transmission time slots identified within the initial polling packet 320.

A microcontroller executing code instructions of the streamlined wireless communication packet polling and reception system at the wireless communications dongle 330 or the information handling system 300 may ensure that, during this data packet communication frame 340, the wireless radio system remains in a receive mode to receive data packets from the one or more paired wireless IO devices (e.g., 380). In other words, the controller of the wireless communications dongle 330 or the information handling system 300 may avoid any power loss or inadvertent data packet collision threat due to a reduction in rapid switching between RX/TX modes during this data packet communication frame 340.

In another example embodiment described with reference to FIG. 4A, in which the wireless communication dongle 430 or the information handling system 400 is paired with only one wireless IO device (e.g., 480) during the data packet communication frame 410, the controller executing code instructions of the streamlined IO device wireless communication packet polling and reception system may accept a requested adjustment from the wireless IO device 480, as also described in greater detail below with respect to FIG. 6. The controller of the wireless communication dongle 430 or the information handling system 400 executing code instructions of the streamlined IO device wireless communication packet polling and reception system in such an embodiment may then receive a plurality of data packets including operational data for the mouse 480 (e.g., positional data) within a second packet 412 up to an Nth packet 413 (e.g., fifth packet), and continue to receive an N+1th packet 414 (e.g., sixth packet) that exceeds the initial allotted data packet number given within the initial polling packet 401 pursuant to a dynamic adjustment to the first data packet communication frame 340 in some embodiments.

In still another example embodiment described with respect to FIG. 4B, in which the wireless communication dongle 430 or the information handling system 400 is paired with more than one wireless IO device (e.g., 480) during the data packet communication frame 420, the controller executing code instructions of the streamlined IO device wireless communication packet polling and reception system may accept an adjustment request to decrease the number/length of data packets transmitted by the first wireless IO device 480 or to decrease the number of time slots allotted for such transmission. Accepting such requested adjustments may not impact the receipt of data packets from the second wireless IO device 490, as instructed within the initial polling packet 403b. In such a scenario, the controller of the wireless communication dongle 430 or the information handling system 400 executing code instructions of the streamlined IO device wireless communication packet polling and reception system in an embodiment may then receive a plurality of data packets from the first wireless IO device 480 within a second packet 412 and up to an N−1th packet 423 (e.g., fourth packet) that is less than the initial allotted data packet number given within the initial polling packet 403a. Following receipt of the N−1th packet 423 from the first wireless IO device 480 in an embodiment, the wireless communication dongle 430 or the information handling system 400 then receive one or more data packets (e.g., first packet 424 up to Mth packet 425) from the second wireless IO device 490. In some embodiments, a decrease adjustment request may dynamically adjust the first data packet communication frame. In other embodiments, a decrease or increase adjustment request may be used to adjust a second, later data packet communication frame.

In yet another example embodiment described with respect to FIG. 4C, in which the wireless communication dongle 430 or the information handling system 400 is paired with more than one wireless IO device (e.g., 480) during the data packet communication frame 440, accepting requested adjustments to increase the number/length of data packets transmitted by the first wireless IO device 480 or the number of time slots in which such a transmission may occur may present an increased risk of data packet transmission collision for any increase (or decrease) adjustment. Because the first wireless IO device 480 is notified within the initial polling packet 405a that a second wireless IO device 490 is also transmitting data packets within the data packet communication frame 440, the first wireless IO device 480 may adhere to the initial, unadjusted instructions given within the initial polling packet 405a during the data packet communication frame 440 to avoid risk of data packet transmission collision. The wireless communication dongle 430 or the information handling system 400 may then receive a plurality of data packets from the first wireless IO device 480 within a second packet 442 and up to an Nth packet 443 (e.g., fifth packet) that is equivalent to the initial allotted data packet number given within the initial polling packet 405a. Following receipt of the Nth packet 443 from the first wireless IO device 480 in an embodiment, the wireless communication dongle 430 or the information handling system 400 then receive one or more data packets (e.g., first packet 444 up to Mth packet 445) from the second wireless IO device 490. Any adjustments to N+1 (or N−1) may then occur at the second data packet communication frame.

At block 514, the data packet communication frame orchestrated according to the initial polling packet transmitted at block 508 may end and the controller for the wireless communication dongle or information handling system may switch the dongle wireless radio system to the TX mode in an embodiment. For example, in an embodiment described with reference to FIG. 3, following the data packet communication frame 340 and time or number of packets allocated for the same, the controller of the wireless communications dongle 330 or the information handling system 300 may switch the wireless radio system to a TX mode for orchestrating a future data packet communication frame.

The controller for the wireless communication dongle or information handling system in an embodiment at block 516 may generate an updated polling packet acknowledging the number of packets received during the previous data packet communication frame to each paired wireless IO device (e.g., N packets or M packets). The updated polling packet in an embodiment may further include instructions for the one or more paired wireless IO devices to transmit another designated number (e.g., N, N+1, N−1) of data packets at identified time slots with updated times within a second data packet communication frame. For example, the controller in an embodiment may execute code instructions of the streamlined wireless communication packet polling and reception system to generate an updated polling packet 370. In an embodiment, such an updated polling packet 370 may include an acknowledgement header (ACK) identifying the number (N) of packets received during the previous data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five packets.

The updated polling packet 370 in an embodiment may further include updated instructions for synchronizing transmission of data packets within a second, later data packet communication frame. For example, the updated polling packet 370 may provide an updated time for initiation of such a second, later data packet communication frame for N packets again. In other embodiments, the streamlined wireless communication packet polling and reception system may have received an adjustment request and the updated polling packet may instruct adjustment to one or more of the allotted data packet number, allotted data packet length, or allotted data packet transmission time slots for the wireless IO device 380. In one example embodiment, the updated polling packet 370 identifying an updated time for initiation of a second, later data packet communication frame may also provide an updated allotted data packet number equivalent to the initial allotted data packet number. In another example, in an embodiment, the updated polling packet 370 may also provide an updated allotted data packet length equivalent to the initial allotted data packet length. In still another example, in an embodiment, the updated polling packet 370 may also provide updated allotted data packet time slots having the same positions within the second data packet communication frame as the positions of the initial allotted data packet transmission time slots within the first data packet communication frame 340. In yet other embodiments, the updated polling packet may reflect requested adjustments to the data packet communication frame.

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication dongle 330 or information handling system 300 and minimize the frequency with which switches between TX mode and RX mode are required. In such a way, the streamlined wireless communication packet polling and reception system may decrease the frequency of ACK data packets transmitted and occupying airtime, and the frequency of mode-switching described above with respect to existing systems. This may further decrease power consumed by rapid mode-switching, decrease latency, and improve overall data throughput and user experience.

In another example embodiment of block 516, described with respect to FIG. 4A, the controller of the wireless communication dongle 430 or the information handling system 400 executing code instructions of the streamlined IO device wireless communication packet polling and reception system in an embodiment may transmit an updated polling packet 402 containing an acknowledgement of receipt of N+1 packets (e.g., six) from the wireless IO device 480 and updated instructions for transmission of data packets during an upcoming second data packet communication frame between the wireless IO device 480 and the wireless communication dongle 430 or the information handling system 400 instructing N+1 packets be sent. The updated polling packet 402 may also instruct the wireless IO device 480 (e.g., mouse) to transmit the increased number or length of data packets or increase the number of time slots as requested within the first data packet 411 and discussed above at block 510 with respect to an embodiment of FIG. 4A in other embodiments.

In yet another example embodiment of block 516 described with respect to FIG. 4B, the controller of the wireless communication dongle 430 or the information handling system 400 executing code instructions of the streamlined IO device wireless communication packet polling and reception system in an embodiment may transmit an updated polling packet 404a or 404b containing an acknowledgement of receipt of N−1 packets (e.g., four) from the wireless IO device 480 and an acknowledgement of M packets received from wireless IO device 490. The updated polling packet 406a and 406b may include updated instructions for transmission of N−1 data packets from wireless IO device 480 and M data packets from wireless IO device 490 during an upcoming second data packet communication frame between the wireless IO device 480 and the wireless communication dongle 430 or the information handling system 400. The updated polling packet 404a or 404b may also instruct the wireless IO device 480 (e.g., mouse) to transmit the decreased (or increased) number or length of data packets or decreased (or increased) number of time slots as requested within the first data packet 421 and discussed above at block 510 with respect to an embodiment of FIG. 4B.

In still another example embodiment of block 516, described with respect to FIG. 4C, the controller of the wireless communication dongle 430 or the information handling system 400 executing code instructions of the streamlined IO device wireless communication packet polling and reception system in an embodiment may transmit an updated polling packet 406a or 406b containing an acknowledgement of receipt of N packets (e.g., five) from the wireless IO device 480 and M packets (e.g., one) from the second wireless IO device 490. The updated polling packet 406a and 406b may also include updated instructions for transmission of data packets during an upcoming second data packet communication frame between the wireless IO device 480, wireless IO device 490, and the wireless communication dongle 430 or the information handling system 400. The updated polling packet 406a or 406b may also instruct the wireless IO device 480 (e.g., mouse) to transmit the increased number or length of data packets or increase the number of time slots as requested within the first data packet 441 and discussed above at block 510 with respect to an embodiment of FIG. 4C.

At block 518, the controller for the wireless communication dongle or information handling system in an embodiment may instruct the wireless radio system to transmit the updated polling packet generated at block 516 to one or more paired wireless IO devices. For example, in an embodiment described with respect to FIG. 3, the controller for the wireless communication dongle 330 or the information handling system 300 in an embodiment may execute code instructions of the streamlined wireless communication packet polling and reception system to instruct the wireless radio system to transmit an updated polling packet 370. As another example, in an embodiment described with respect to FIG. 4A, the controller for the wireless communication dongle 430 or the information handling system 400 in an embodiment may execute code instructions of the streamlined wireless communication packet polling and reception system to instruct the wireless radio system to transmit an updated polling packet 402 to the wireless IO device 480. As yet another example, in an embodiment described with respect to FIG. 4B, the controller for the wireless communication dongle 430 or the information handling system 400 in an embodiment may execute code instructions of the streamlined wireless communication packet polling and reception system to instruct the wireless radio system to transmit an updated polling packet 404a or 404b to the wireless IO devices 480 and 490. In still another example, in an embodiment described with respect to FIG. 4C, the controller for the wireless communication dongle 430 or the information handling system 400 in an embodiment may execute code instructions of the streamlined wireless communication packet polling and reception system to instruct the wireless radio system to transmit an updated polling packet 406a or 406b to the wireless IO devices 480 and 490.

The controller of the wireless communication dongle or the information handling system in an embodiment at block 520 may determine whether the dongle or the information handling system has powered down. If the wireless communication dongle or the information handling system has powered down in an embodiment, there may be no need or no capability to switch the dongle wireless radio system to a RX mode for further communication with the IO device, and the method may then end. If the wireless communication dongle or the information handling system has not powered down in an embodiment, the method may proceed to block 522 to assess whether the linked IO device is still responsive (e.g., not powered down or in sleep mode) and capable of engaging in further data packet communication frames with the wireless communication dongle.

At block 522, in an embodiment in which the wireless communication dongle and information handling system remain active (e.g., not powered down), the controller of the wireless communication dongle or the information handling system may determine whether additional packets are received from the wireless IO device prior to expiration of a device responsiveness timer. For example, the controller of the wireless communication dongle 330 or the information handling system 300 executing code instructions of the streamlined IO device wireless communication packet polling and reception system in an embodiment may initiate a device responsiveness timer having a preset duration (e.g., two minutes, five minutes, ten minutes). If no further data packets are received from the wireless IO device 380 before the device responsiveness timer expires, this may indicate that the wireless IO device 380 has been powered down or entered a sleep mode. If additional packets are received from the wireless IO device (e.g., 380) prior to expiration of the device responsive timer, this may indicate the wireless IO device is still active and the method may proceed to block 510 for transmission of more data packets by the wireless IO device (e.g., 380) during a new data packet communication frame. If no additional packets are received from the wireless IO device (e.g., 380) prior to expiration of the device responsiveness timer, the method may proceed back to 502 for scanning of multiple frequencies to receive requests from other wireless IO devices to connect with the wireless communication dongle or the information handling system. For example, the controller of the wireless communication dongle 330 or the information handling system 300 executing code instructions of the streamlined IO device wireless communication packet polling and reception system in an embodiment may terminate the wireless link with the wireless IO device 380 and return to the RX mode to scan multiple frequencies for incoming requests from other wireless IO devices to pair with the wireless communication dongle 330 or the information handling system 300. By repeating the loop between blocks 502 and 522, the streamlined wireless communication packet polling and reception system may decrease the frequency of ACK data packets transmitted by the wireless communication dongle or information handling system, and the frequency of mode-switching described above with respect to existing systems. This may further decrease power consumed by rapid mode-switching, decrease latency, and improve overall wireless IO device throughput and user experience.

In an embodiment in which additional data packets are received from the wireless IO device either within the second data packet communication frame or prior to expiration of the device responsiveness timer, the controller of the wireless communication dongle or the information handling system executing code instructions of the streamlined IO device wireless communication packet polling and reception system in an embodiment may switch the wireless radio system to RX mode and receive another plurality of data packets as instructed within the updated polling packet transmitted at block 516. For example, the controller of the wireless communication dongle 330 or the information handling system 300 executing code instructions of the streamlined IO device wireless communication packet polling and reception system in an embodiment may switch the wireless radio system to RX mode and receive another plurality of data packets as instructed within the updated polling packet 370. As another example described with reference to FIG. 4A, the controller of the wireless communication dongle 430 or the information handling system 400 executing code instructions of the streamlined IO device wireless communication packet polling and reception system may switch the wireless radio system to RX mode and receive another plurality of data packets as instructed within the updated polling packet 402. In yet another example described with reference to FIG. 4B, the controller of the wireless communication dongle 430 or the information handling system 400 executing code instructions of the streamlined IO device wireless communication packet polling and reception system may switch the wireless radio system to RX mode and receive another plurality of data packets as instructed within the updated polling packet 404a or 404b. In still another example described with reference to FIG. 4C, the controller of the wireless communication dongle 430 or the information handling system 400 executing code instructions of the streamlined IO device wireless communication packet polling and reception system may switch the wireless radio system to RX mode and receive another plurality of data packets as instructed within the updated polling packet 406a or 406b. In such a way, the streamlined wireless communication packet polling and reception system may decrease the frequency of ACK data packets transmitted, and the frequency of mode-switching described above with respect to existing systems. This may further decrease power consumed by rapid mode-switching and decrease latency and improve overall wireless IO device performance and user experience.

Figure 6:
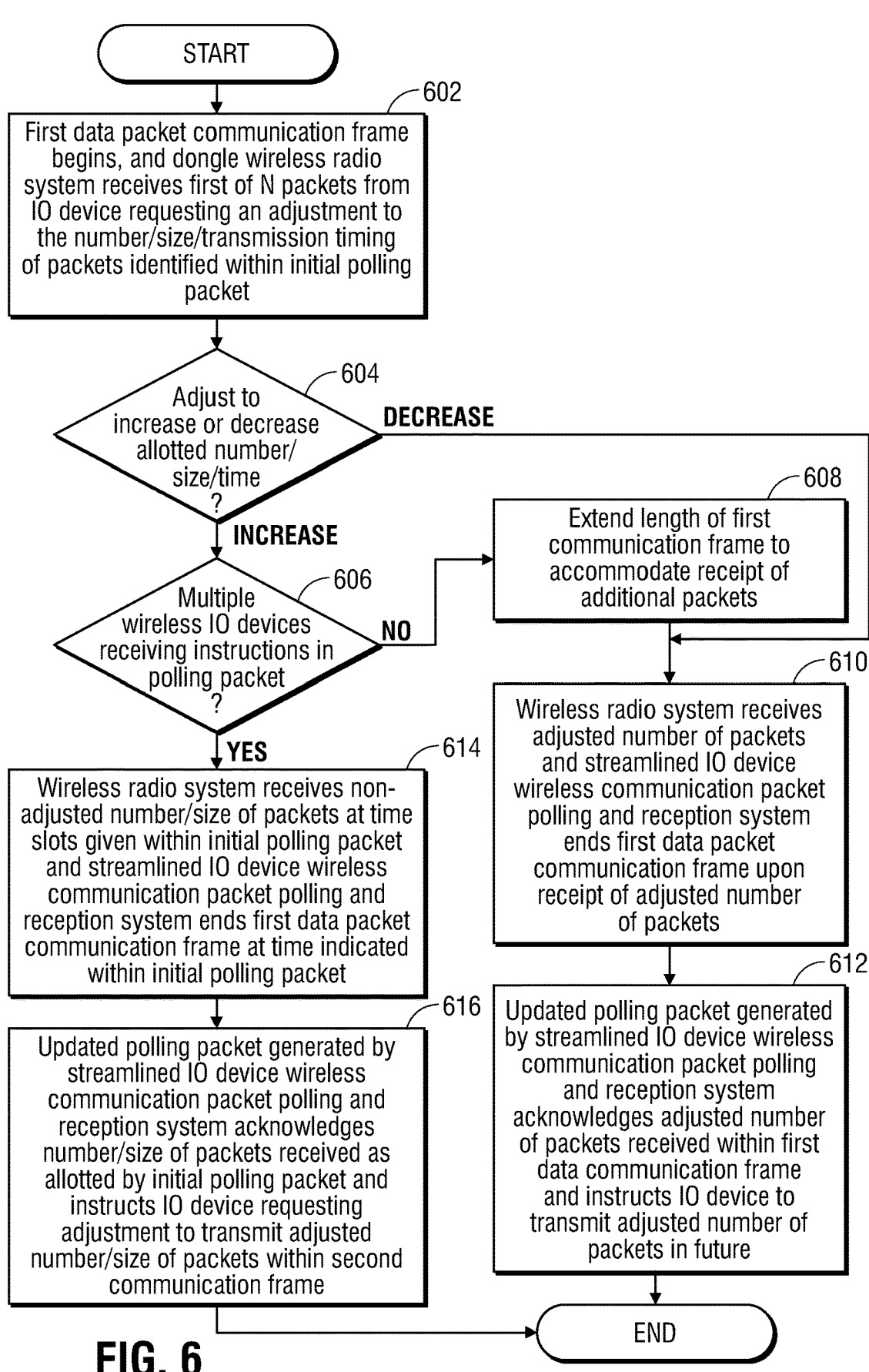
FIG. 6 is a flow diagram illustrating a method of generating an updated polling packet based on a requested adjustment to allotted values within an initial polling packet for data packet communication frames with one or more wireless IO devices according to embodiments of the present disclosure.

FIG. 6 is a flow diagram illustrating a method of generating an updated polling packet based on a requested dynamic adjustment to allotted values within an initial polling packet for one or more wireless IO devices for orchestrating receipt of data packets within a future data packet communication frame according to embodiments of the present disclosure. As described herein, one or more wireless IO devices paired to the wireless communication dongle or information handling system executing code instructions of the streamlined IO device wireless communication packet polling and reception system may request adjustment of the initial allotted data packet number, initial allotted data packet length, or initial allotted data packet time slots identified within an initial poll packet transmitted by the wireless communication dongle or information handling system.

At block 602, a first data packet communication frame may begin with the transmission of a first data packet within a data packet communication frame from a wireless IO device to the wireless communication dongle or information handling system executing the streamlined IO device wireless communication packet polling and reception system. The first data packet transmitted in such a way may include an adjustment to the number/length of the data packets allotted for transmission within an initial polling packet orchestrating the data packet communication frame. For example, in an embodiment described with reference to FIG. 4A, the first packet 411 transmitted from a wireless IO device (e.g., 480) during a data packet communication frame 410 to a wireless radio system of a wireless communication dongle 430 or information handling system 400 may include a request to adjust the initial allotted data packet number, initial allotted data packet length, or initial allotted data packet time slots identified within an initial poll packet 401. In another example embodiment described with reference to FIG. 4B, the first packet 421 transmitted from a wireless IO device (e.g., 480) during a data packet communication frame 420 to a wireless radio system of a wireless communication dongle 430 or information handling system 400 may include a request to adjust the initial allotted data packet number, initial allotted data packet length, or initial allotted data packet time slots identified within an initial poll packet 403a and 403b. In yet another example embodiment described with reference to FIG. 4C, the first packet 441 transmitted from a wireless IO device (e.g., 480) during a data packet communication frame 440 to a wireless radio system of a wireless communication dongle 430 or information handling system 400 may include a request to adjust the initial allotted data packet number, initial allotted data packet length, or initial allotted data packet time slots identified within an initial poll packet 405a and 405b.

The controller of the wireless communication dongle or information handling system executing code instructions of the streamlined IO device wireless communication packet polling and reception system may determine whether the requested adjustment requests an increase or decrease in the initial allotted data packet number, initial allotted data packet transmission time slots, or initial allotted data packet length given within the initial data packet. A request to decrease any of these values may not present an increased risk of data packet transmission collision during the first data packet communication frame orchestrated by the initial polling packet. However, in some cases, a requested increase in one or more of these values may present an increased risk of data packet transmission collision. If the requested adjustment is to decrease the allotted number/length of data packets transmitted or the number of time slots at which such transmission occurs within the data packet communication frame orchestrated by the initial polling packet, the method may proceed to block 610 for acceptance of the requested adjustment during the same data packet communication frame. If the requested adjustment is to increase the allotted number/length of data packets transmitted or the number of time slots at which such transmission occurs within the data packet communication frame orchestrated by the initial polling packet, the method may proceed to block 606 to determine whether acceptance of such a request may increase the likelihood of data packet transmission collision.

In an embodiment in which the requested adjustment is to increase the allotted number/length of data packets transmitted or the number of time slots at which such transmission occurs, the controller of the wireless communication dongle or information handling system executing code instructions of the streamlined IO device wireless communication packet polling and reception system may determine whether multiple wireless IO devices have received instructions for transmission of data packets during the current data packet communication frame. For example, the wireless communication dongle or information handling system may be paired with a single wireless IO device and may indicate during an initial polling packet that only this single wireless IO device will transmit data packets during the current data packet communication frame. In such an embodiment, increasing the number/length of data packets that the single linked wireless IO device may transmit or the number of time slots allotted for such transmission during the current data packet communication frame may not present an increased risk of data packet transmission collision. This may be the case because no other wireless IO devices are expected to be transmitting data packets that may collide with the data packets transmitted by the single paired wireless IO device during the current wireless data packet communication frame. In such a case, the method may proceed to block 608 to accept the request to increase the number/length of data packets transmitted by the single paired wireless IO device or to increase the number of time slots in which such data packets are transmitted within the current data packet communication frame.

In another example embodiment, the wireless communication dongle or information handling system may be paired with a plurality of wireless IO devices and may indicate during an initial polling packet that more than one wireless IO device will transmit data packets during the current data packet communication frame. In such an embodiment, increasing the number/length of data packets that the single wireless IO device may transmit or the number of time slots allotted for such transmission during the current data packet communication frame may present an increased risk of data packet transmission collision. This may be the case because a second wireless IO device is expected to be transmitting data packets that may collide with the additional or unexpected data packets transmitted by a first wireless IO device during the current wireless data packet communication frame that exceed the allotments identified within the initial polling packet. In such a case, the method may proceed to block 614 to accept the request to increase the number/length of data packets transmitted by the requesting wireless IO device or to increase the number of time slots in which such data packets are transmitted within a future data packet communication frame, rather than the current data packet communication frame.

The controller at block 608 in an embodiment in which a single paired wireless IO device requests an increase in allotted values identified within an initial polling packet may extend the length of a current data packet communication frame to accommodate receipt of additional packets. For example, in an embodiment described with reference to FIG. 4A, the controller of the wireless communication dongle 430 or information handling system 400 executing code instructions of the streamlined IO device wireless communication packet polling and reception system may respond to the requested adjustment within the first data packet 411 (e.g., as described above with respect to block 602) by extending the length of the data packet communication frame 410. Such an extension may allow the wireless IO device 480 to transmit the N+1th data packet 414 prior to the wireless communication dongle 430 or information handling system 400 switching to TX mode to transmit the updated polling packet 402.

At block 610, in an embodiment in which the requested adjustment described at block 602 is accepted to alter the allotments described within the initial polling packet for the current data packet communication frame, the wireless radio system of the wireless communication dongle may receive the adjusted number of packets and end the current data packet communication frame upon receipt of those adjusted number of packets. For example, in an embodiment described with respect to FIG. 4A, the wireless radio system of the wireless communication dongle 430 or information handling system 400 may receive the N+1th packet 414, according to the requested adjustment in the first packet 411 of the data packet communication frame 410. In such an example embodiment, the controller of the wireless communication dongle 430 or information handling system 400 executing code instructions streamlined IO device wireless communication packet polling and reception system may instruct the wireless radio system to shift to TX mode, thus ending the data packet communication frame 410 upon receipt of the N+1th packet 414. As another example, in an embodiment described with respect to FIG. 4B, the wireless radio system of the wireless communication dongle 430 or information handling system 400 may receive the N−1th packet 423, according to the requested adjustment in the first packet 421 of the data packet communication frame 420. In such an example embodiment, the controller of the wireless communication dongle 430 or information handling system 400 executing code instructions the streamlined IO device wireless communication packet polling and reception system may instruct the wireless radio system to shift to TX mode, thus ending the data packet communication frame 410 upon receipt of the N−1th packet 423 and receipt of the Mth packet 425.

The controller in an embodiment at block 612 may generate an updated polling packet that also addresses the accepted adjustment request. For example, in an embodiment described with reference to FIG. 4A, the controller of the wireless communication dongle 430 or information handling system 400 executing code instructions of the streamlined IO device wireless communication packet polling and reception system may respond to the requested adjustment within the first data packet 411 (e.g., as described above with respect to block 602) by generating an updated polling packet 402 that instructs the wireless IO device 480 to transmit the increased number of data packets (e.g., N+1) requested in the first data packet 411 during an upcoming second data packet communication frame. Such an updated polling packet 402 may further acknowledge the receipt of the increased number of data packets (e.g., N+1) within the first data packet communication frame 411.

As another example, in an embodiment described with reference to FIG. 4B, the controller of the wireless communication dongle 430 or information handling system 400 executing code instructions of the streamlined IO device wireless communication packet polling and reception system may respond to the requested adjustment within the first data packet 421 (e.g., to decrease one or more allotted values within the initial polling packet 403*a* or 403*b*) by generating an updated polling packet 404*a* or 404*b* that instructs the wireless IO device 480 to transmit the decreased number of data packets requested in the first data packet 421 during an upcoming second data packet communication frame. Such an updated polling packet 404*a* or 404*b* may further acknowledge the receipt of the decreased number of data packets (e.g., N−1) within the first data packet communication frame 421. The method for generating an updated polling packet based on received requests to adjust allotment values within an initial polling packet may then end.

At block 614, in an embodiment in which a request to adjust allotment values within an initial polling packet during a current data packet communication frame are rejected, the requesting wireless IO device may transmit data packets according to the initial polling packet during the current data packet communication frame. For example, in an embodiment described with reference to FIG. 4C, a request to increase the number of data packets transmitted or the number of time slots at which those data packets are transmitted from the first wireless IO device 480 would require the wireless communication dongle 430 or the information handling system 400 to receive data packets from the first wireless IO device 480 during time slots previously allotted for transmission of data packets from the second wireless IO device 490 within the initial polling packet 405*b*. Because the first wireless IO device 480 is notified within the initial polling packet 405*a* that a second wireless IO device 490 is also transmitting data packets within the data packet communication frame 440, the first wireless IO device 480 may adhere to the initial, unadjusted instructions given within the initial polling packet 405*a* during the data packet communication frame 440 to avoid risk of data packet transmission collision. In such an embodiment, the requested adjustment given within the first data packet 441 transmitted by the first wireless IO device 480 during the data packet communication frame 440 may act as a request to adjust allotted transmission values during an upcoming, future data packet communication frame following data packet communication frame 440. The wireless communication dongle 430 or the information handling system 400 may then receive a plurality of further data packets from the first wireless IO device 480 including operational data for the mouse 480 (e.g., positional data) within a second packet 442 and up to an Nth packet 443 (e.g., fifth packet) that is equivalent to the initial allotted data packet number given within the initial polling packet 405*a*.

The controller of the wireless communication dongle or information handling system executing code instructions of the streamlined IO device wireless communication packet polling and reception system in an embodiment at block 616 may generate an updated polling packet accepting the requested adjustments for a future data packet communication frame, rather than the current data packet communication frame. For example, the controller of the wireless communication dongle 430 or the information handling system 400 executing code instructions of the streamlined IO device wireless communication packet polling and reception system in an embodiment may then transmit an updated polling packet (e.g., 406*a* and 406*b*) containing an acknowledgement of receipt of N packets (e.g., five) from the wireless IO device 480 during the first data packet communication frame 440. Such an updated polling packet 406*a* or 406*b* may further include updated instructions for transmission of N+1 and M data packets during an upcoming second data packet communication frame between the first wireless IO device 480, the second wireless device 490, and the wireless communication dongle 430 or the information handling system 400. In an embodiment, the controller of the wireless communication dongle 430 or the information handling system 400 executing code instructions of the streamlined IO device wireless communication packet polling and reception system may further dynamically respond to the received requested adjustment for increasing allotments within the data packet 441 by adjusting the number or length of data packets or time slots allotted for transfer by the wireless IO device 480 during an upcoming second data packet communication frame. In such a way, the streamlined wireless communication packet polling and reception system may decrease the frequency of ACK data packets transmitted, and the frequency of mode-switching described above with respect to existing systems. This may further decrease power consumed by rapid mode-switching, decrease latency and improve wireless IO device throughput and overall user experience.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A streamlined input/output (IO) device wireless communication packet polling and reception system of a wireless communication dongle at an information handling system comprising:

a controller to execute code instructions of the streamlined IO device wireless communication packet polling and reception system to transmit with a wireless radio system an initial polling packet to poll a first wireless IO device paired with the wireless communication dongle and identify an initial first wireless IO device allotted data packet number and initial first wireless IO device allotted data packet transmission time slots for orchestrating transmission of data packets from the first wireless IO device to the wireless communication dongle;

the controller to switch the wireless radio system of the wireless communication dongle to receive during a first data packet communication frame a first transmitted number of data packets at the initial first wireless IO device allotted data packet transmission time slots from the first wireless IO device corresponding to the initial first wireless IO device allotted data packet number; and the controller to execute code instructions to transmit with the wireless radio system a second, updated polling packet acknowledging receipt of the first transmitted number of data packets and instructing the first wireless IO device for transmission of data packets during a second data packet communication frame to conduct efficient wireless switching between transmit and receive functions of the wireless communication dongle.

2. The streamlined IO device wireless communication packet polling and reception system of the wireless communication dongle of claim 1, wherein the first wireless IO device is a mouse.

3. The streamlined IO device wireless communication packet polling and reception system of the wireless communication dongle of claim 1, wherein the first wireless IO device is a keyboard.

4. The streamlined IO device wireless communication packet polling and reception system of the wireless communication dongle of claim 1, wherein the first wireless IO device communicates with the paired wireless communication dongle during the first data packet communication frame via a wireless link established according to Bluetooth Low Energy (BLE) radio modulation encoding.

5. The streamlined IO device wireless communication packet polling and reception system of the wireless communication dongle of claim 1, wherein the second, updated polling packet further identifies a second, updated wireless IO device allotted data packet number.

6. The streamlined IO device wireless communication packet polling and reception system of the wireless communication dongle of claim 1 further comprising:

the initial polling packet to poll a second wireless IO device paired with the wireless communication dongle and identify an initial second wireless IO device allotted data packet number and initial second wireless IO device allotted data packet transmission time slots during the first data packet communication frame; and the updated polling packet acknowledging receipt of a second transmitted number of data packets from the second wireless IO device and instructing the second wireless IO device for transmission of data packets during the second data packet communication frame.

7. The streamlined IO device wireless communication packet polling and reception system of the wireless communication dongle of claim 1 further comprising:

the wireless radio system to receive a connection request from the first wireless IO device identifying the model of the first wireless IO device; and the controller to execute code instructions of the streamlined IO device wireless communication packet polling and reception system to generate the initial polling packet based on a stored profile associated with the identified model indicating a standard data packet transmission rate for the identified model to determine the initial first wireless IO device allotted packet number.

8. A method of orchestrating streamlined transmission of data packets between a wireless communication dongle of an information handling system and a first wireless input/output (IO) device comprising:

generating, via a controller for the wireless communication dongle, an initial polling packet for orchestrating transmission of data packets from the first wireless IO device to a wireless radio system of the wireless communication dongle during a first data packet communication frame; transmitting, via the wireless radio system of the wireless communication dongle, the initial polling packet to the first wireless IO device paired with the wireless communication dongle including an initial first wireless IO device allotted data packet number for the first wireless IO device; and transmitting, via the wireless radio system an updated polling packet, after the first data packet communication frame, including acknowledgment of receipt of a first plurality of data packets received from the first wireless IO device during the first data packet communication frame meeting the initial first wireless IO device allotted data packet number, and an updated first wireless IO device allotted data packet number for orchestrating transmission of data packets from the first wireless IO device during a second data packet communication frame for wirelessly streaming data from the first wireless IO device.

9. The method of claim 8, wherein the first wireless IO device is a mouse.

10. The method of claim 8, wherein the first wireless IO device is a gaming headset.

11. The method of claim 8, wherein the first wireless IO device is paired and wirelessly communicates with the wireless communication dongle via a wireless link established according to Bluetooth Low Energy (BLE) radio modulation encoding.

12. The method of claim 8 further comprising;

receiving, via the wireless radio system, a first packet with an adjustment to the initial first wireless IO device allotted data packet number during the first data packet communication frame the first wireless IO device identifying a model of the first wireless IO device.

13. The method of claim 8 further comprising:

receiving, via the wireless radio system, a connection request from the first wireless IO device identifying a model of the first wireless IO device; and generating, via the controller for the wireless communication dongle, the initial polling packet and the initial first wireless IO device allotted data packet number based on a stored first device profile associated with the identified model of the first wireless IO device.

14. The method of claim 8 further comprising:

transmitting the initial polling packet to a second wireless IO device paired with the wireless communication dongle including an initial second wireless IO device allotted data packet number for the second wireless IO device; and transmitting the updated polling packet to the second wireless IO device, including acknowledgment of receipt of a second plurality of data packets received from the second wireless IO device during the first data packet communication frame meeting the initial second wireless IO device allotted data packet number.

15. A streamlined input/output (IO) device wireless communication packet polling and reception system of a wireless radio system of an information handling system comprising:

a controller to execute code instructions of the streamlined IO device wireless communication packet polling and reception system to transmit with the wireless radio system an initial polling packet to poll a first wireless IO device paired with the wireless radio system and identify an initial allotted data packet number, an initial allotted data packet length, and initial allotted data packet transmission time slots for orchestrating transmission of data packets from the first wireless IO device to the wireless radio system;

the controller to switch the wireless radio system to receive during a first data packet communication frame a first transmitted number of data packets of the initial allotted data packet length, at the initial allotted data packet transmission time slots from the first wireless IO device corresponding to the initial allotted data packet number; and the controller to execute code instructions to transmit with the wireless radio system a second, updated polling packet acknowledging receipt of the first transmitted number of data packets and instructing the first wireless IO device for transmission of data packets during a second data packet communication frame to conduct efficient wireless switching between transmit and receive of the wireless radio system.

16. The streamlined IO device wireless communication packet polling and reception system of the wireless radio system of claim 15 further comprising:

the controller to scan with the wireless radio system a plurality of wireless frequencies for incoming requests from the first wireless IO device or a second wireless IO device to establish a wireless link with the wireless radio system; and the wireless radio system to receive a connection request from the first wireless IO device, prior to generation and transmission of the initial polling packet.

17. The streamlined IO device wireless communication packet polling and reception system of the wireless radio system of claim 15 further comprising:

the wireless radio system to receive a connection request from the first wireless IO device identifying the model of the first wireless IO device; and the controller to execute code instructions of the streamlined IO device wireless communication packet polling and reception system to generate the initial polling packet based on a stored profile associated with the identified model indicating a standard data packet length transmitted by the identified model as a basis for selecting the initial allotted data packet length.

18. The streamlined IO device wireless communication packet polling and reception system of the wireless radio system of claim 15 further comprising:

the controller to determine failure of the first wireless IO device to transmit data packets prior to expiration of a device responsiveness timer initiated upon a detected failure of the first wireless IO device to transmit data packets at the updated allotted data packet transmission time slots identified within the updated polling packet; and the controller to scan, with the wireless radio system, a plurality of wireless frequencies for incoming requests from the first wireless IO device or a second wireless IO device to establish a wireless link with the wireless communication dongle.

19. The streamlined IO device wireless communication packet polling and reception system of the wireless radio system of claim 15, wherein the first wireless IO device is a mouse.

20. The streamlined IO device wireless communication packet polling and reception system of the wireless radio system of claim 15, wherein the wireless radio system is part of a wireless communication dongle operatively coupled to the information handling system.

* * * * *